United States Patent
Koh et al.

(10) Patent No.: US 12,284,301 B2
(45) Date of Patent: Apr. 22, 2025

(54) SLIDABLE ELECTRONIC DEVICE AND OPERATING METHOD THEREOF

(71) Applicant: Samsung Electronics Co., Ltd., Suwon-si (KR)

(72) Inventors: Sanghyuk Koh, Suwon-si (KR); Juyeoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 17/739,853

(22) Filed: May 9, 2022

(65) Prior Publication Data
US 2022/0368784 A1  Nov. 17, 2022

Related U.S. Application Data

(63) Continuation of application No. PCT/KR2022/005735, filed on Apr. 21, 2022.

(30) Foreign Application Priority Data

May 13, 2021  (KR) .................... 10-2021-0061946

(51) Int. Cl.
  *H04M 1/02*    (2006.01)
  *G06F 1/16*    (2006.01)
  *H04M 1/72454*  (2021.01)

(52) U.S. Cl.
  CPC ........ *H04M 1/0239* (2013.01); *G06F 1/1624* (2013.01); *G06F 1/1652* (2013.01);
  (Continued)

(58) Field of Classification Search
  CPC ............. H04M 1/0239; H04M 1/0268; H04M 1/72454; H04M 2201/38; H04M 1/0245;
  (Continued)

(56) References Cited

U.S. PATENT DOCUMENTS 12,032,789 B1 *  7/2024  Agrawal ............. G06F 3/04186
2010/0167791 A1   7/2010  Lim
(Continued)

FOREIGN PATENT DOCUMENTS

KR      10-1562582 B1     10/2015
KR   10-2016-0142172 A    12/2016
(Continued)

OTHER PUBLICATIONS

Extended European Search Report dated Jun. 26, 2024; European Appln. No. 22807648.5-1218 / 4270165 PCT/KR2022005735.
(Continued)

*Primary Examiner* — Julio R Perez
(74) *Attorney, Agent, or Firm* — Jefferson IP Law, LLP

(57) ABSTRACT

An electronic device is provided. The electronic device includes a housing, a flexible display including a display area, wherein the display area is extendable in one or more directions with respect to the housing by moving a portion of the flexible display through the housing to be visually exposed, and at least one processor configured to be operatively connected to the flexible display, wherein the at least one processor is configured to display first content on a first area of the flexible display, detect an event for displaying second content related to the first content, identify an attribute of the second content according to the detection of the event, identify a direction in which the flexible display is to be extended based on the attribute of the second content, and display at least a portion of the second content in a second area of the flexible display extended in the identified direction.

17 Claims, 23 Drawing Sheets

(52) U.S. Cl.
CPC ..... *H04M 1/0268* (2013.01); *H04M 1/72454* (2021.01); *H04M 2201/38* (2013.01)

(58) Field of Classification Search
CPC .. H04M 1/0235; G06F 1/1624; G06F 1/1652; G06F 1/16; G06F 1/1677; G06F 3/0484; G06F 2203/04803; G06F 3/04883; G06F 3/04886; G06F 1/1694
See application file for complete search history.

(56) References Cited

U.S. PATENT DOCUMENTS

| | | | |
|---|---|---|---|
| 2017/0147189 A1 | 5/2017 | Ryu et al. | |
| 2018/0342225 A1* | 11/2018 | Yun | H04N 21/431 |
| 2018/0374452 A1 | 12/2018 | Choi et al. | |
| 2019/0261519 A1 | 8/2019 | Park et al. | |
| 2019/0346954 A1 | 11/2019 | Jung et al. | |
| 2021/0034210 A1 | 2/2021 | Chung et al. | |
| 2022/0329687 A1* | 10/2022 | Kim | H04M 1/72469 |
| 2024/0264629 A1* | 8/2024 | Zhang | G06F 1/1618 |
| 2024/0264634 A1* | 8/2024 | Manning | G06F 1/1618 |
| 2024/0264714 A1* | 8/2024 | Song | G06F 1/1641 |

FOREIGN PATENT DOCUMENTS

| | | |
|---|---|---|
| KR | 10-2017-0060519 A | 6/2017 |
| KR | 10-1821053 B1 | 3/2018 |
| KR | 10-2018-0128261 A | 12/2018 |
| KR | 10-2019-0098340 A | 8/2019 |
| KR | 10-2019-0101184 A | 8/2019 |
| KR | 10-2019-0128843 A | 11/2019 |
| KR | 10-2020-0002686 A | 1/2020 |
| KR | 10-2020-0075809 A | 6/2020 |
| WO | 2021/045276 A1 | 3/2021 |

OTHER PUBLICATIONS

International Search Report and written opinion dated Jul. 22, 2022, issued in International Application No. PCT/KR2022/005735.

* cited by examiner

SLIDABLE ELECTRONIC DEVICE AND OPERATING METHOD THEREOF

CROSS-REFERENCE TO RELATED APPLICATION(S)

This application is a continuation application, claiming priority under § 365(c), of an International application No. PCT/KR2022/005735, filed on Apr. 21, 2022, which is based on and claims the benefit of a Korean patent application number 10-2021-0061946, filed on May 13, 2021, in the Korean Intellectual Property Office, the disclosure of which is incorporated by reference herein in its entirety.

TECHNICAL FIELD

The disclosure relates to a slidable electronic device and a method for operating the same.

BACKGROUND ART

Various types of flexible electronic devices have been developed in line with development of electronic technologies. Such electronic devices may both provide larger screens and secure portability. For example, a flexible electronic device may have a shape that can be changed by a force applied from a user, thereby providing a foldable, bendable, slidable, or rollable display. For example, a display using organic light-emitting diodes (or an electronic device equipped therewith) may implement stable operations even when manufactured to be substantially thin.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In the case of an electronic device including a flexible display, the size of the display area of the flexible display may be changed as the flexible display is changed to an open or closed state by a movement of a structure that forms the electronic device.

According to technological development, electronic devices can be manufactured so as to be free from bezels and physical buttons, and electronic devices can also be designed such that microphones and speakers are placed therein, instead of on external surfaces thereof, such that users are not required to distinguish the direction of electronic devices.

For example, an electronic device may display various content such as application execution screens or icons through the display area, and the position or size of displayed content may be varied if the size of the display area is changed. However, if the flexible display of an electronic device is configured to be extended or reduced in only one direction at a predetermined ratio, there will be a restriction in displaying content varied according to system events or attributes of content. Therefore, there is a need to adaptively change the extension direction of a flexible display of an electronic device such that the user can view various content more efficiently.

Aspects of the disclosure are to address at least the above-mentioned problems and/or disadvantages and to provide at least the advantages described below. Accordingly, an aspect of the disclosure is to provide a slidable electronic device and a method for operating the same, wherein in connection with an electronic device including a flexible display that can be extended in one or more directions, the extension direction is determined differently according to content, thereby providing the user with improved user experiences.

Additional aspects will be the set forth in part in the description which follows and, in part, will be apparent from the description, or may be learned by practice of the presented embodiments.

Technical Solution

In accordance with an aspect of the disclosure, an electronic device is provided. The electronic device includes a housing, a flexible display including a display area, wherein the display area is extendable in one or more directions with respect to the housing by moving a portion of the flexible display through the housing to be visually exposed, and at least one processor configured to be operatively connected to the flexible display, wherein the at least one processor is configured to display first content on a first area of the flexible display, detect an event for displaying second content related to the first content, identify an attribute of the second content according to the detection of the event, identify a direction in which the flexible display is to be extended based on the attribute of the second content, and display at least a portion of the second content in a second area of the flexible display extended in the identified direction.

In accordance with an aspect of the disclosure, a method performed by an electronic device is provided. The method includes displaying first content on a first area of a flexible display of the electronic device, the flexible display including a display area, wherein the display area is extendable in one or more directions with respect to a housing of the electronic device by moving a portion of the flexible display through the housing to be visually exposed, detecting an event for displaying second content related to the first content, identifying an attribute of the second content according to the detection of the event, identifying a direction in which the flexible display is to be extended, based on the attribute of the second content, and displaying at least a portion of the second content in a second area of the flexible display extended in the identified direction.

Advantageous Effects

According to various embodiments, in connection with an electronic device including a flexible display that can be extended in one or more direction among multiple directions, the extension direction may be determined differently according to content, thereby providing the user with improved user experiences.

According to various embodiments, when extensions in multiple directions are possible, the extension direction may be adaptively changed such that the user can view content more efficiently.

According to various embodiments, when a flexible display is extended, the same may be extended in a direction that considers not only attributes of content, but also the arrangement of the electronic device, thereby effectively displaying additional content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
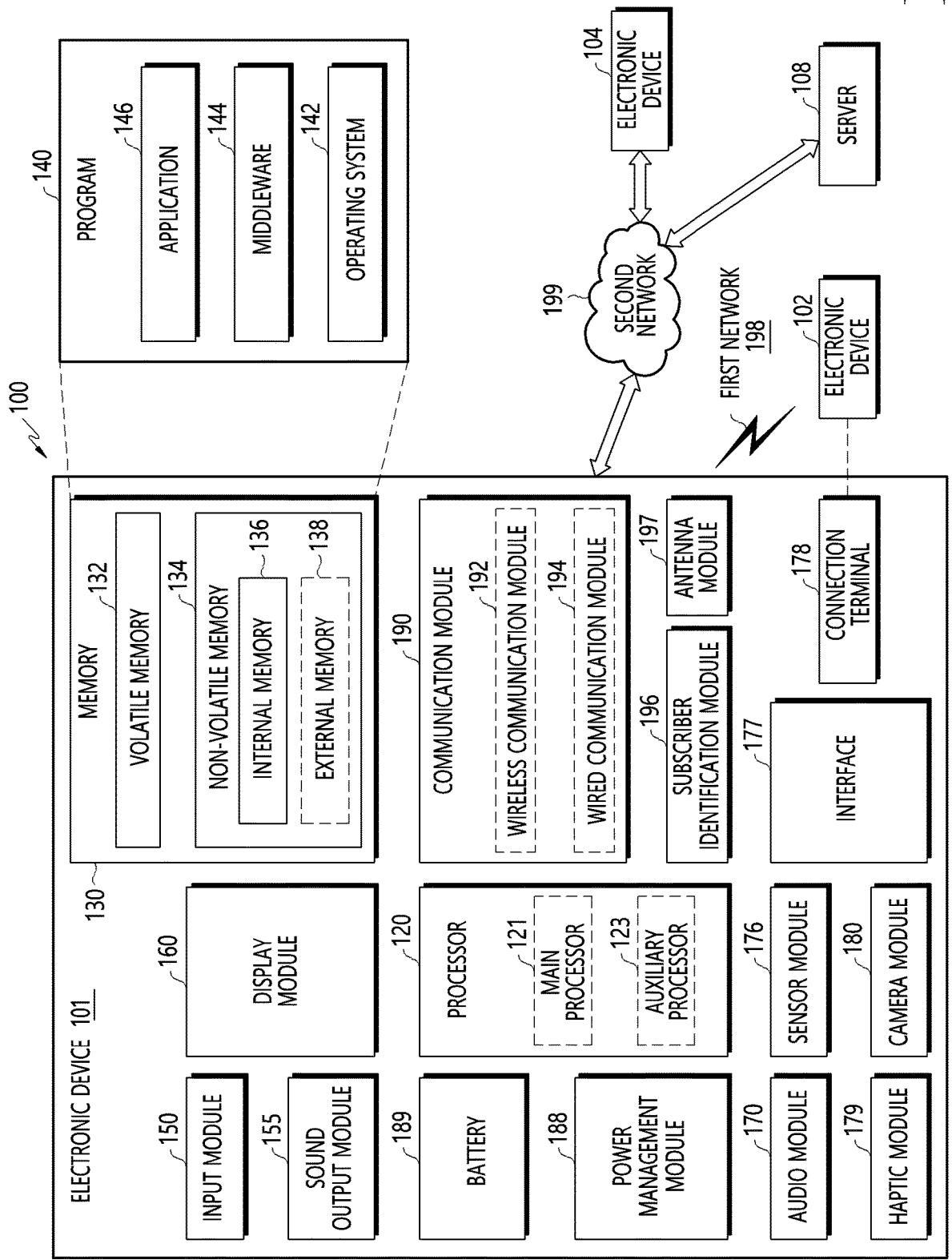
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A to 2D is a diagram illustrating a type of an electronic device according to various embodiments of the disclosure. According to various embodiments, an electronic device 201, 202, 203, or 204 of FIGS. 2A to 2D (e.g., the electronic device 101 of FIG. 1) may include a housing, a display (e.g., the display module 160 of FIG. 1), and at least one processor (e.g., the processor 120 of FIG. 1) that is operatively connected to the display.

According to various embodiments, at least a portion of the display may be exposed to the outside through the housing. According to various embodiments, the display may include one or more displays. According to various embodiments, the display may include a non-bendable unfolded display (e.g., a flat display or an edge display) or a flexible display (e.g., a foldable display, a rollable display, or a stretchable display). Hereinafter, the display is described as a flexible display, but the disclosure is not limited thereto, and an unfolded display may be applied.

According to various embodiments, at least one processor capable of performing and controlling the functions of the electronic device 201, 202, 203, or 204, and a memory (e.g., the memory 130 of FIG. 1) may be arranged in the housing.

According to various embodiments, a state in which the exposed area of the flexible display is the smallest is referred to as a "closed state", and a state in which the exposed area of the flexible display is the largest is referred to as an "open state".

Figure 2A:
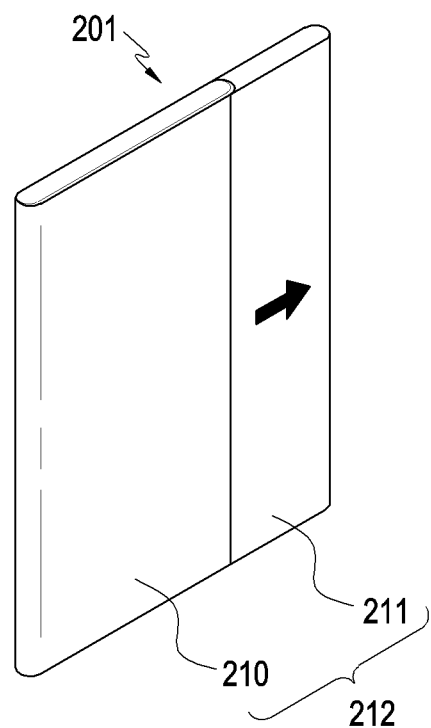
FIGS. 2A, 2B, 2C, and 2D is a diagram illustrating a type of an electronic device according to various embodiments of the disclosure.

According to various embodiments of the disclosure, referring to FIG. 2A, at least a portion of the flexible display may be received (e.g., slide-in) into the inside of the housing or exposed (e.g., slide-out) to the outside of the housing. For example, when a sliding-out command is received in a state in which the slidable electronic device 201 is closed, a portion of the flexible display located inside the housing may be exposed to the outside of the housing to be in an open state. For example, an exposed portion 210 of the flexible display in the closed state of the electronic device 201 may be referred to as a first portion, and an exposed portion of the flexible display in the open state of the electronic device 201 may be referred to as a second portion. For example, the second portion 212 may be an area obtained by adding the first portion and an extended area 211 of the flexible display according to a sliding-out operation. For example, the flexible display disposed on the housing of the flexible display may be in a fixed state.

According to various embodiments, when a sliding-in command is received in a state in which the slidable electronic device 201 is opened, a portion of the flexible display located outside the housing may slide into the housing to be in a closed state. For example, the exposed portion 212 of the flexible display in a state in which the electronic device 201 is opened may be referred to as a first portion, and the exposed portion 210 of the flexible display in a state in which the electronic device 201 is closed may be referred to as a second portion. For example, the exposed portion 210 of the flexible display after the extended area 211 of the flexible display enters the housing according to the sliding-in operation in the first portion may be the second portion.

Figure 2B:
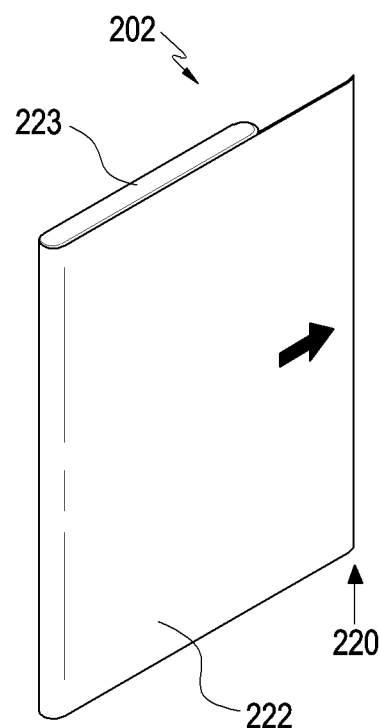

According to various embodiments, referring to FIG. 2B, the flexible display may be disposed to cover at least a portion of the front surface, one side surface, and the rear surface of the electronic device 202.

For example, when the sliding-out command is received in a state in which the slidable electronic device 202 is closed, a portion of the flexible display may be moved (e.g., slides) so that the edge portion 220 of the flexible display disposed on the front of the electronic device 202 is moved (e.g., slides) in a direction of being out of the housing of the electronic device 202. For example, the electronic device 202 may drive a roller (not shown) for moving the flexible display. As the flexible display moves, a portion of the flexible display disposed on the rear surface 223 of the electronic device 202 may move toward the front surface of the electronic device 202, so that the exposed portion 222 of the flexible display may extend. For example, the flexible display disposed on the housing of the flexible display may move. According to various embodiments, a state in which the exposed portion 222 of the flexible display is the largest may be referred to as an open state.

According to various embodiments, when the sliding-in command is received in a state in which the slidable electronic device 202 is opened, the roller (not shown) may be driven so that the edge portion 220 of the flexible display disposed on the front surface of the electronic device 202 is moved (e.g., slides) to the outside of the housing of the electronic device 202 toward the housing. A portion of the flexible display disposed on the front surface of the electronic device 202 may move to the rear surface 223 of the electronic device 202 according to the driving of the roller, so that the exposed portion of the flexible display may be reduced. A state in which the exposed portion of the flexible display is the smallest may be referred to as a closed state.

According to various embodiments, the flexible display of the slidable electronic device 202 may be arranged to enter the housing of the electronic device 202 instead of the rear surface of the electronic device 202 in an area surrounding one side of the electronic device 202.

FIGS. 3A to 3F are diagrams illustrating an example of a sliding operation of a flexible display of an electronic device according to various embodiments of the disclosure.

Figure 3A:
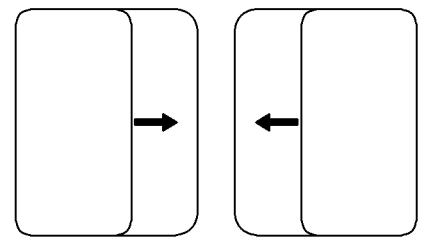
FIGS. 3A, 3B, 3C, 3D, 3E, and 3F are diagrams illustrating an example of a sliding operation of a flexible display of an electronic device according to various embodiments of the disclosure.
Figure 3B:
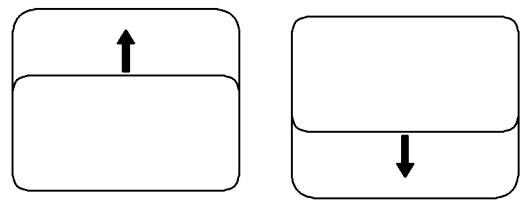

Although it is illustrated that the flexible display extends to the right of the electronic device 201 or 202 in FIGS. 2A and 2B, the disclosure is not limited thereto. Referring to FIG. 3A, the flexible display can be extended or reduced to the right or left of the electronic device 201 or 202. Referring to FIG. 3B, when the electronic device 201 or 202 is horizontally arranged, the flexible display may be extended or reduced in an upward or downward direction of the electronic device 201 or 202.

In FIGS. 2A and 2B, it is illustrated that the long side of the flexible display of the rectangular electronic device 201 or 202 is moved so that the flexible display is extended or reduced, but the disclosure is not limited thereto. For example, as illustrated in FIG. 3C, the short side of the flexible display of the rectangular electronic device 201 or 202 may be moved to extend or reduce the flexible display.

Figure 3C:
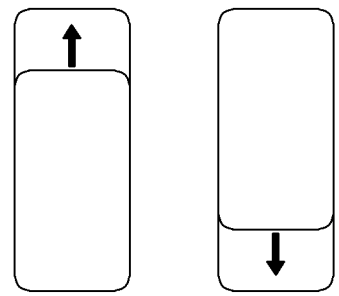

Referring to FIG. 3C, it is illustrated that the rectangular electronic device 201 or 202 is arranged vertically (e.g., in a portrait mode) and the short side of the flexible display is moved upward or downward so that the flexible display can be extended or reduced, but the disclosure is not limited thereto. For example, the rectangular electronic device 201 or 202 may be horizontally arranged (e.g., in a landscape mode) so that the short side of the flexible display is moved left or right to extend or reduce the flexible display.

Figure 3D:
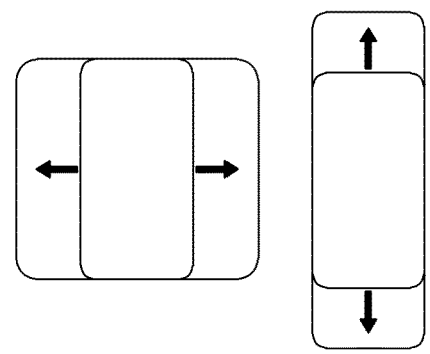

Although it is illustrated that the electronic devices 201 are 202 are illustrated as having a rectangular shape in FIGS. 2A and 2B, the disclosure is not limited thereto. Referring to FIG. 3D, the electronic devices 201 and 202 may have a square shape. For example, the electronic device 201 or 202 may move one side of the flexible display upward, downward, right, or left to extend or reduce the flexible display.

Although it is illustrated that the flexible display is extended or reduced in only one direction of the electronic devices 201 and 202 in FIGS. 2A and 2B, the disclosure is not limited thereto. For example, referring to FIG. 2C, the slidable electronic device 203 may extend or reduce the flexible display in both directions.

According to various embodiments, the electronic device 203 may extend or reduce the flexible display in only one of both directions, or may extend or reduce the flexible display in both directions.

Figure 2C:
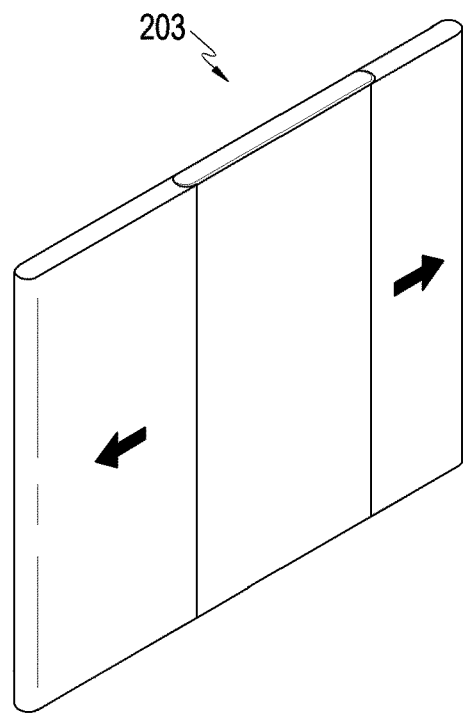
Figure 3E:
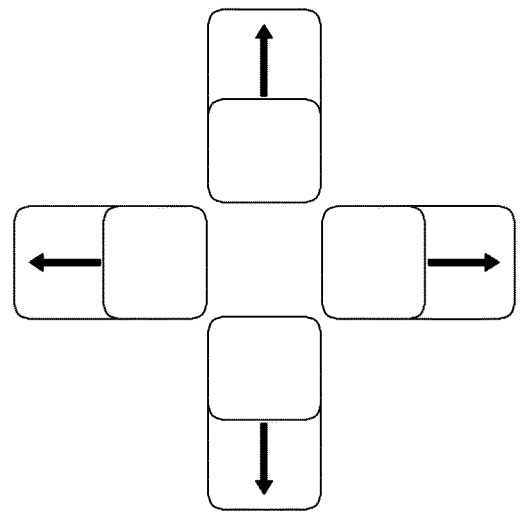

Although it is illustrated that long sides of both sides of the flexible display of the rectangular electronic device 203 move in both directions (e.g., left and right) to extend or reduce the flexible display in FIG. 2C, but the disclosure is not limited thereto. Referring to FIG. 3E, short sides of both sides of the flexible display of the rectangular electronic device 203 may move in both directions (e.g., upward and downward) to extend or reduce the flexible display.

Although it is illustrated that the rectangular electronic device 203 is vertically arranged in FIGS. 2C and 3E, obviously, the electronic device 203 may be arranged horizontally. According to various embodiments, the electronic device 203 may have a square shape.

Figure 2D:
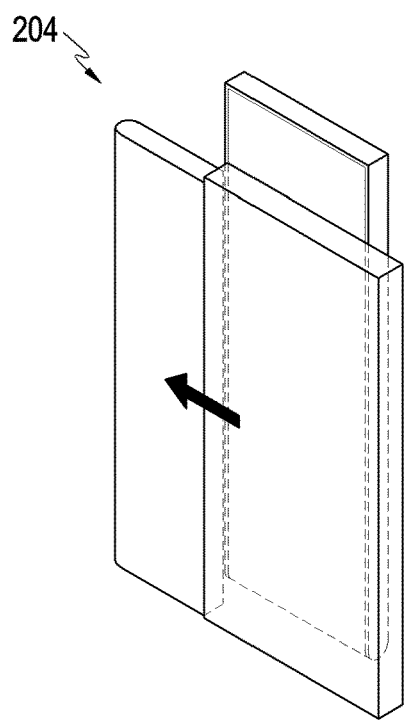

Although it is illustrated that the flexible display is extended or reduced to both sides in FIG. 2C, the disclosure is not limited thereto. Referring to FIG. 2D, the slidable electronic device 204 may extend or reduce the flexible display in two directions (e.g., one of left or right and one of upward or downward) rather than bidirectional.

Figure 3F:
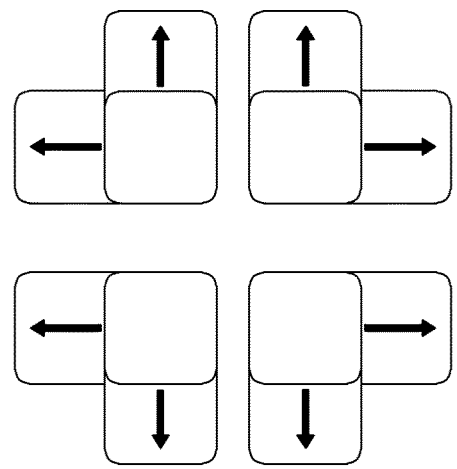

Referring to FIG. 3F, the electronic device 204 that is slidable in two directions may extend or reduce the flexible display in left and upward directions, left and downward directions, right and upward directions, or right and downward directions.

According to various embodiments, the slidable electronic device 204 may extend or reduce the flexible display through a sliding operation of a portion of the flexible display disposed inside the housing in two directions. As another embodiment, the electronic device 204 may extend or reduce the flexible display in one direction through the sliding operation of a portion of the flexible display disposed inside the housing as shown in FIG. 2A, and may extend or reduce the flexible display in the other direction in such a manner that the flexible display moves toward the front surface or rear surface of the electronic device 204 while covering at least a portion of the front surface, one side surface, and the rear surface of the electronic device 204 as shown in FIG. 2B.

Although it is illustrated that the flexible display is extended or reduced in two directions in FIGS. 2D and 3F, the disclosure is not limited thereto. The flexible display may be extended or reduced in three directions or four directions.

Figure 4A:
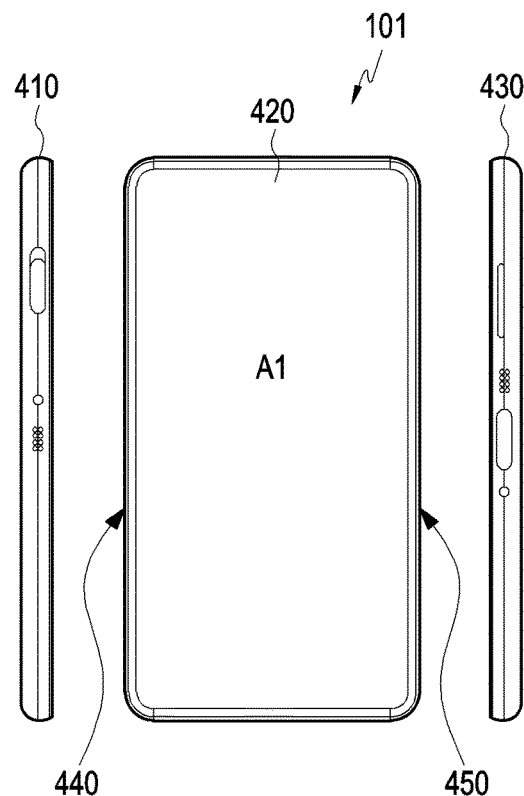
FIGS. 4A and 4B are diagrams illustrating a reduced and extended state of a flexible display when an electronic device is horizontally arranged according to an embodiment of the disclosure.
Figure 4B:
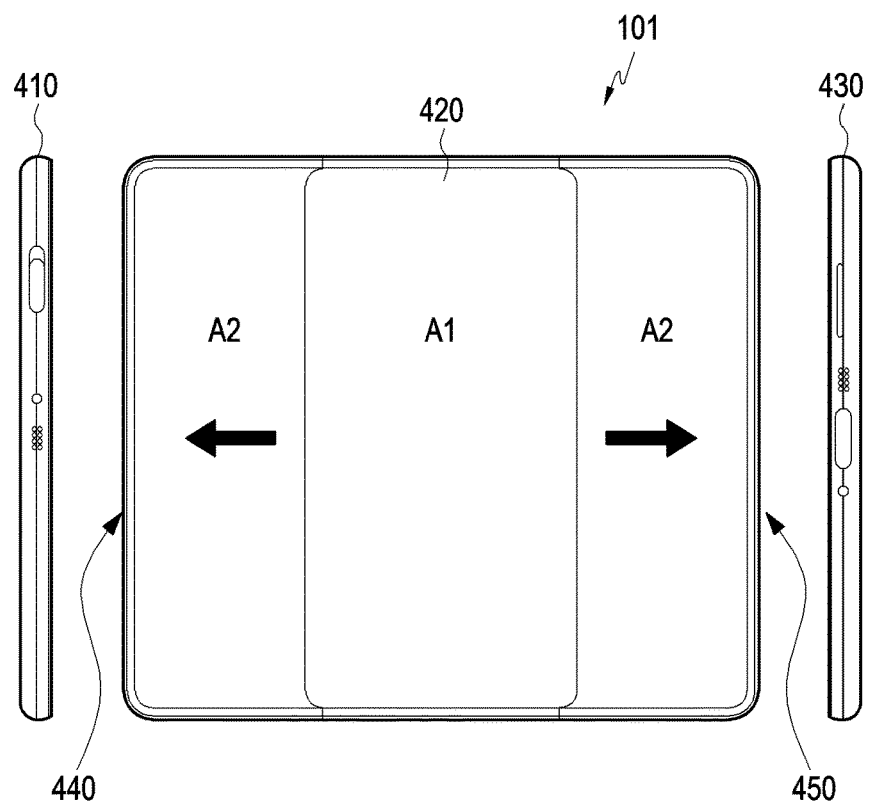
Figures 5A, 5B:
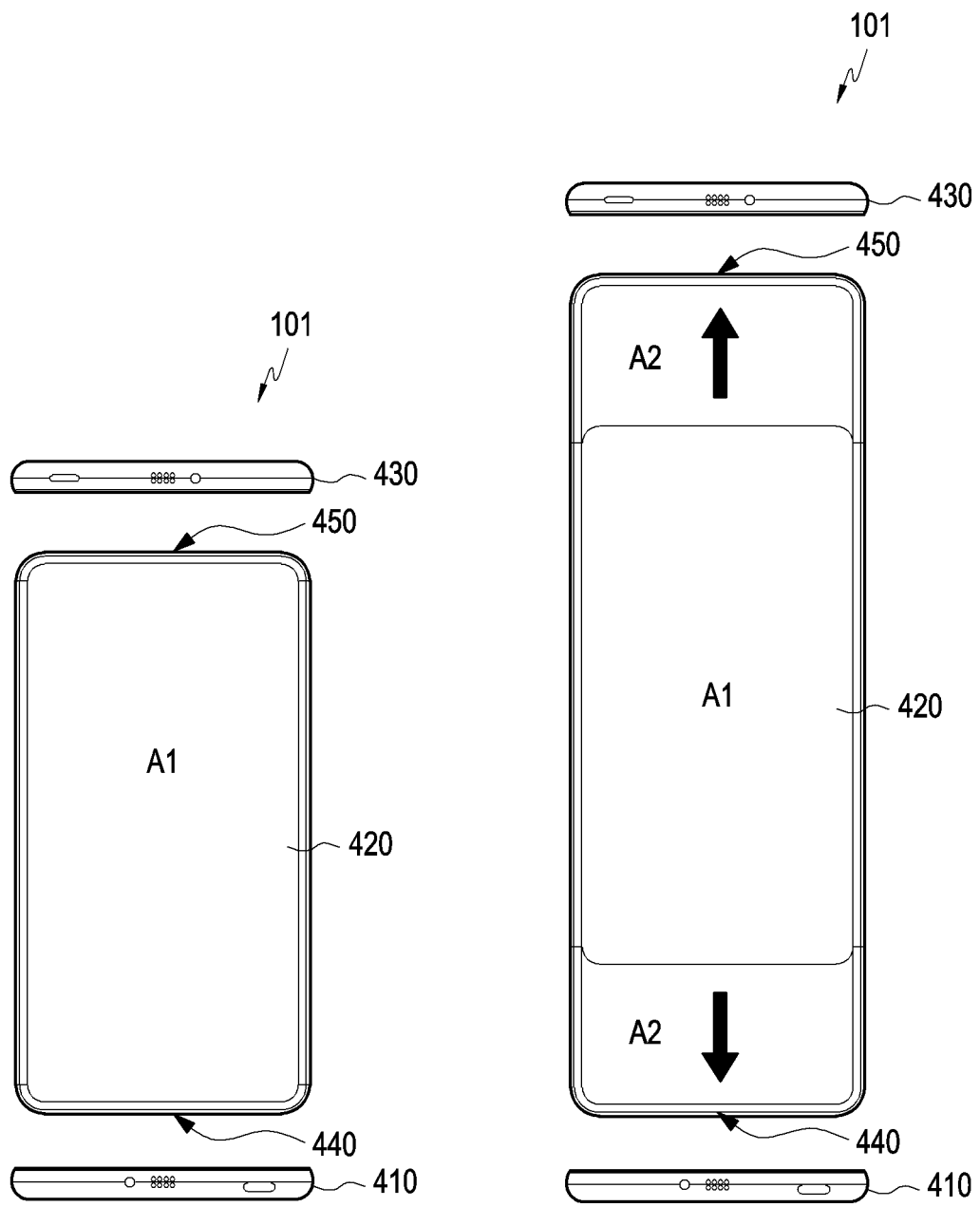
FIGS. 5A and 5B are diagrams illustrating a reduced and extended state of a flexible display when an electronic device is vertically arranged according to an embodiment of the disclosure.

FIGS. 4A and 4B are diagrams illustrating an extended state or reduced state of a flexible display when an electronic device is horizontally (e.g., landscape mode) arranged according to an embodiment of the disclosure. FIGS. 5A and 5B are diagrams illustrating a reduced and extended state of a flexible display when an electronic device is vertically (e.g., portrait mode) arranged according to an embodiment of the disclosure.

FIGS. 4A and 5A are diagrams illustrating a state in which the flexible display is reduced, and FIGS. 4B and 5B are diagrams illustrating an open state in which most of the flexible display is exposed to the front surface of the electronic device. According to an embodiment, the flexible display may be extended by a predetermined distance in one direction, and a structure that enables reciprocating motion for extension or reduction may be disposed.

Referring to FIGS. 4A, 4B, 5A and 5B, the electronic device 101 may include a housing 420 and a display disposed in a space formed by the housing 420. At least a portion of the display may have a form that is foldable or bendable, slidable, or rollable. A surface on which the flexible display is disposed (or the surface on which the display module 160 is viewed from the outside of the electronic device 101) may be defined as the front surface of the electronic device 101. In addition, the opposite surface of the front surface may be defined as the rear surface of the electronic device 101. In addition, a surface surrounding a space between the front surface and the rear surface may be defined as a side surface of the electronic device 101.

According to various embodiments, as shown in FIGS. 4A and 4B, the housing 420 may include a first sidewall 410 and a second sidewall 430 formed on a first side surface (or long side) (e.g., side surface 440 or side surface 450). In addition, as shown in FIGS. 5A and 5B, the housing 420 may include the first sidewall 410 and the second sidewall 430 formed on a second side surface (or short side) (e.g., side surface 440 and side surface 450).

According to various embodiments, a portion (e.g., a first area A1) of the display may be a basic use area in a state in which the display is reduced (or sliding-in), and another portion (e.g., a second area A2) of the display may be an extended area in a state in which the display is extended (or sliding-out).

In the embodiment shown in FIG. 4A, the basic use area (e.g., the first area A1) is shown in a reduced state of the display, and according to the embodiment shown in FIG. 4B, the extended area (e.g., the second area A2) may be formed on either the left side or the right side of the display when the display is extended. According to various embodiments, as the side surface (e.g., the side surface 440 or the side surface 450) of the display linearly moves in an X-axis direction, the size of the display area may be changed. For example, the display area of the flexible display may include the second area A2 that extends in any one direction (e.g., a left or right direction) from the first area A1 when the display area is extended.

In the embodiment shown in FIG. 5A, the basic use area (e.g., the first area A1) is shown in a reduced state of the display, and according to the embodiment shown in FIG. 5B, the extended area (e.g., the second area A2) may be formed on either the upper side or the lower side of the display when the display is extended. According to various embodiments, as the side surface (e.g., the side surface 440 or the side surface 450) of the display linearly moves in a Y-axis direction, the size of the display area may be changed. For example, the display area of the flexible display may include the second area A2 that extends in any one direction (e.g., an upward or downward direction) from the first area A1 when the display area is extended.

Figure 6:
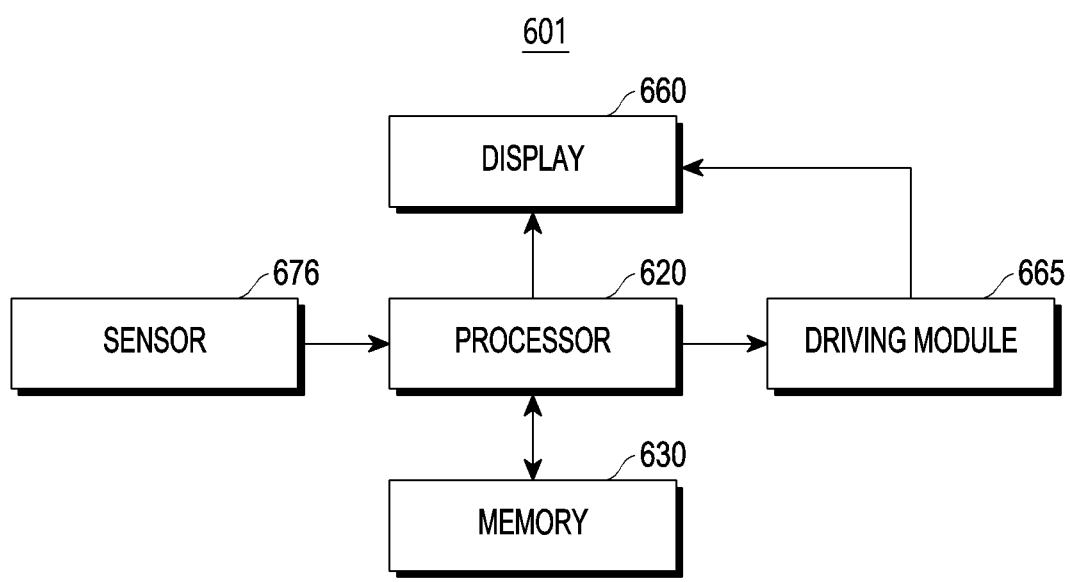
FIG. 6 is an internal block diagram illustrating a slidable electronic device according to an embodiment of the disclosure.

FIG. 6 is an internal block diagram illustrating a slidable electronic device according to an embodiment of the disclosure.

Referring to FIG. 6, components for determining an extension direction to correspond to content are shown, and since the operation of each component included in the electronic device 101 corresponds to the components in FIG. 1, a detailed description thereof will be omitted.

Referring to FIG. 6, a flexible display 660 (e.g., the display module 160 of FIG. 1) that senses an input by a stylus pen or an input by a user's body (e.g., a finger) may be provided in an electronic device 601 (e.g., the electronic device 101 of FIG. 1). According to various embodiments, the flexible display 660 may simultaneously support input/output functions of data and may sense a touch. According to an embodiment, the flexible display 660 may be referred to as a touch screen.

According to an embodiment, the flexible display 660 of FIG. 6 may be the flexible display described above with reference to FIGS. 4 and 5.

According to various embodiments, the flexible display 660 may move in any one of two or more directions with respect to the main housing of the electronic device 601 so that the size of the display area in which at least a partial area of the flexible display 660 is ejected from the inside of the housing and visually exposed can be extended. For example, when the flexible display 660 is in a closed state, the display area of the flexible display 660 may refer to the first area A1 exposed to the outside, and when the flexible display 660 is changed to the open state, the display area of the flexible display 660 may include the second area A2 extended from the first area A1. The display area is an area in which the flexible display 660 is ejected from the main housing and exposed to the outside, and may also be referred to as a screen. Accordingly, in the following description, the display area and the screen will be used interchangeably.

The flexible display 660 may be driven by the driving module 665 and may be automatically ejected from the housing.

The driving module 665 may allow the flexible display 660 to be ejected from the housing and may include an actuator. For example, the driving module 665 may include a motor and a gear, and may allow the flexible display 660 to be ejected from the housing by rotating the motor under the control of the processor 620.

The memory 630 may store a program (or application, algorithm, or processing loop) for calculating information (e.g., coordinates information and/or displacement information) on the position of an input means such as a finger or a stylus pen from data through the flexible display 660.

According to various embodiments, the memory 630 may be operatively connected to the processor 620, and may be the same as the memory 130 of FIG. 1. The memory 630 may store various types of information related to the operation of the electronic device 601, for example, information related to a direction in which the flexible display 660 is extended based on a content attribute.

According to various embodiments, the processor 620 may be the same as the processor 120 of FIG. 1. The processor 620 may control the overall operation of the electronic device 601 and, according to an embodiment, may determine an extension direction of the flexible display 660 based on content.

According to various embodiments, the processor 620 may display first content in the display area on the flexible display 660 in a state where the first portion of the flexible display 660 is exposed to the outside. Here, the first content may include an application execution screen that can be displayed on the flexible display 660, a still image, a moving image, text, a graphic object, a web page, or a visually expressible image including these.

According to various embodiments, the processor 620 may determine an extension direction based on the attribute of second content in response to the occurrence of an event for displaying the second content related to the first content while the first content is being displayed on the flexible display 660. Here, the second content is content that can be additionally displayed in relation to the displayed first content, and may be referred to as detailed content or additional content related to displayable items while the first content is being displayed. For example, when the execution screen of the application executed in the electronic device 601 is being displayed as the first content, the execution screen of the application may include an object for displaying the second content, and the second content may include an additional screen corresponding to the selection of the object.

According to various embodiments, the processor 620 may identify whether an event for displaying additional second content related to the first content is detected while the first content is being displayed on the first area of the flexible display 660. Upon detecting the event, the processor 620 may determine the extension direction of the flexible display 660 based on the second content.

According to various embodiments, the event for displaying the second content may include at least one of a touch input to an object related to the display of the second content in the execution screen of the application displayed on the first area, a scroll input on a designated area in the first area, or a predetermined input. For example, whether the flexible display 660 is extended may be triggered by various predetermined input methods such as a double finger input and a touch contact time (e.g., long press) in addition to a touch input to an object for displaying additional content.

According to various embodiments, the processor 620 may store, in the memory 630, information related to a user configuration for determining whether to extend the flexible display 660 for additionally displaying the second content in relation to the first content.

For example, when an option for displaying additional content in the extended area is in an activate state, for example, when the user configuration is configured as "ON", the processor 620 may extend the flexible display 660 to display the additional content. On the other hand, when the option is in an inactive state, for example, when the user configuration is configured as "OFF", the processor 620 may overlap and display at least a portion of the additional content on content being displayed without extending the flexible display 660.

According to various embodiments, the processor 620 may differently determine the extension direction of the flexible display 660 that is extendable in at least one of a plurality of directions according to the content. As described above, when the flexible display 660 can be extended in the plurality of directions, the extension direction can be adaptively changed, so that the user can view the content more efficiently.

Meanwhile, a method of determining the extension direction of the flexible display 660 will be described in detail below.

According to various embodiments, a sensor 676 may be the same as the sensor module 176 of FIG. 1. According to an embodiment, the at least one sensor 676 may be used to identify an arrangement state or arrangement direction of the electronic device 601. For example, the processor 620 may identify whether the electronic device 601 is horizontally or vertically arranged using the at least one sensor 676 as shown in FIGS. 3A and 3B.

According to various embodiments, when the arrangement direction of the electronic device 601 identified using the sensor 676 is a landscape orientation, the processor 620 may display at least a portion of the second content in an area extended in the identified direction of a first direction or a second direction of the electronic device 601 together with the first content displayed in the first area. For example, the processor 620 may extend the flexible display 660 in an upward or downward direction of the electronic device 601 according to the attribute of the second content.

On the other hand, when the identified arrangement direction of the electronic device 601 is a portrait orientation, the processor 620 may display at least a portion of the second content in an area extended in the identified direction of a third direction or a fourth direction of the electronic device. For example, the processor 620 may extend the flexible display 660 in a left direction or a right direction of the electronic device 601 according to the attribute of the second content.

According to various embodiments, the electronic device 601 may further include a haptic module (e.g., the haptic module 179 of FIG. 1) capable of notifying the user of the start of a sliding-out operation (or extension of the flexible display 660) and a sliding-out direction (or extension direction) on the flexible display 660 at the time of the sliding-out operation. According to an embodiment, the haptic module may be disposed at a position corresponding to the flexible display 660 so that a tactile feedback can be provided to the user while the user holds the electronic device 601. For example, when the sliding-out operation is started and the flexible display 660 is in the maximum open state, the user may be notified through the tactile feedback so that the user can recognize the extended state.

According to various embodiments, the processor 620 may provide at least one of an indicator, sound, lighting, and vibration for recognizing the direction in which the flexible display 660 is extended, as an object. For example, the processor 620 may provide at least one of lighting or vibration to at least a portion of the flexible display 660 corresponding to the extended direction using a sound like "Sliding is in progress to the right (or left, upward, or downward)". For example, the object may be displayed on an arbitrary area of the flexible display 660, and there is no limitation on the shape and/or display position of the object. According to various embodiments, the processor 620 may display the object for at least a part of the time after an event for starting the sliding-out operation is detected and before the sliding operation is completed.

According to various embodiments, the processor 620 may provide a guide object related to the display of the additional content together with the object. For example, the guide object may be an object for inducing the display of additional content related to the content displayed on the flexible display 660.

According to various embodiments, the electronic device 601 may include a housing, the flexible display 660 including a display area, wherein the display area is extendable in one or more directions with respect to the housing by moving a portion of the flexible display through the housing to be visually exposed, and the at least one processor 620 that is operatively connected to the flexible display 660, wherein the at least one processor 620 may be configured to display first content on a first area of the flexible display 660, detect an event for displaying second content related to the first content, identify an attribute of the second content according to the detection of the event, identify a direction in which the flexible display 660 is to be extended based on the attribute of the second content, and display at least a portion of the second content in a second area of the flexible display 660 extended in the identified direction.

According to various embodiments, the at least one processor may be configured to identify a position corresponding to a predetermined area where the second content is to be displayed based on the first area, and identify the direction in which the flexible display is to be extended based on the position.

According to various embodiments, the at least one processor may be configured to identify any one area of divided areas in the first area based on the predetermined area where the second content is to be displayed, and identify the direction in which the flexible display is to be extended to correspond to the identified area.

According to various embodiments, the at least one processor may be configured to identify any one area of the divided areas in the first area based on a position of an object related to the display of the second content displayed on the first area and the predetermined area where the second content is to be displayed.

According to various embodiments, the electronic device may further include a sensor that senses an arrangement direction of the electronic device, wherein the at least one processor is configured to identify the arrangement direction of the electronic device using the sensor.

According to various embodiments, the at least one processor may be configured to display at least a portion of the second content in the second area of the flexible display extended in the identified direction of a first direction or a second direction of the electronic device when the arrangement direction of the electronic device is a landscape orientation, and display at least a portion of the second content in the second area of the flexible display extended in the identified direction of a third direction or a fourth direction of the electronic device when the arrangement direction of the electronic device is a portrait orientation.

According to various embodiments, the at least one processor may be configured to detect an event for displaying the second content based on at least one of an input to an object related to the display of the second content displayed on the first area, a scroll input on the first area, or a predetermined input.

According to various embodiments, the at least one processor may be configured to store a user configuration related to whether the second content is displayed in the second area of the flexible display, in the memory.

According to various embodiments, the at least one processor may be configured to identify a direction where the flexible display is to be extended when the display of the second content is configured to be activated in the second area, based on the user configuration.

According to various embodiments, the at least one processor may be configured to overlap and display at least a portion of the second content on the first area when the display of the second content is configured to be deactivated in the second area, based on the user configuration.

According to various embodiments, the at least one processor may be configured to display at least a portion of the second content in the second area of the flexible display extended in the identified direction together with the first content displayed on the first area.

Figure 7:
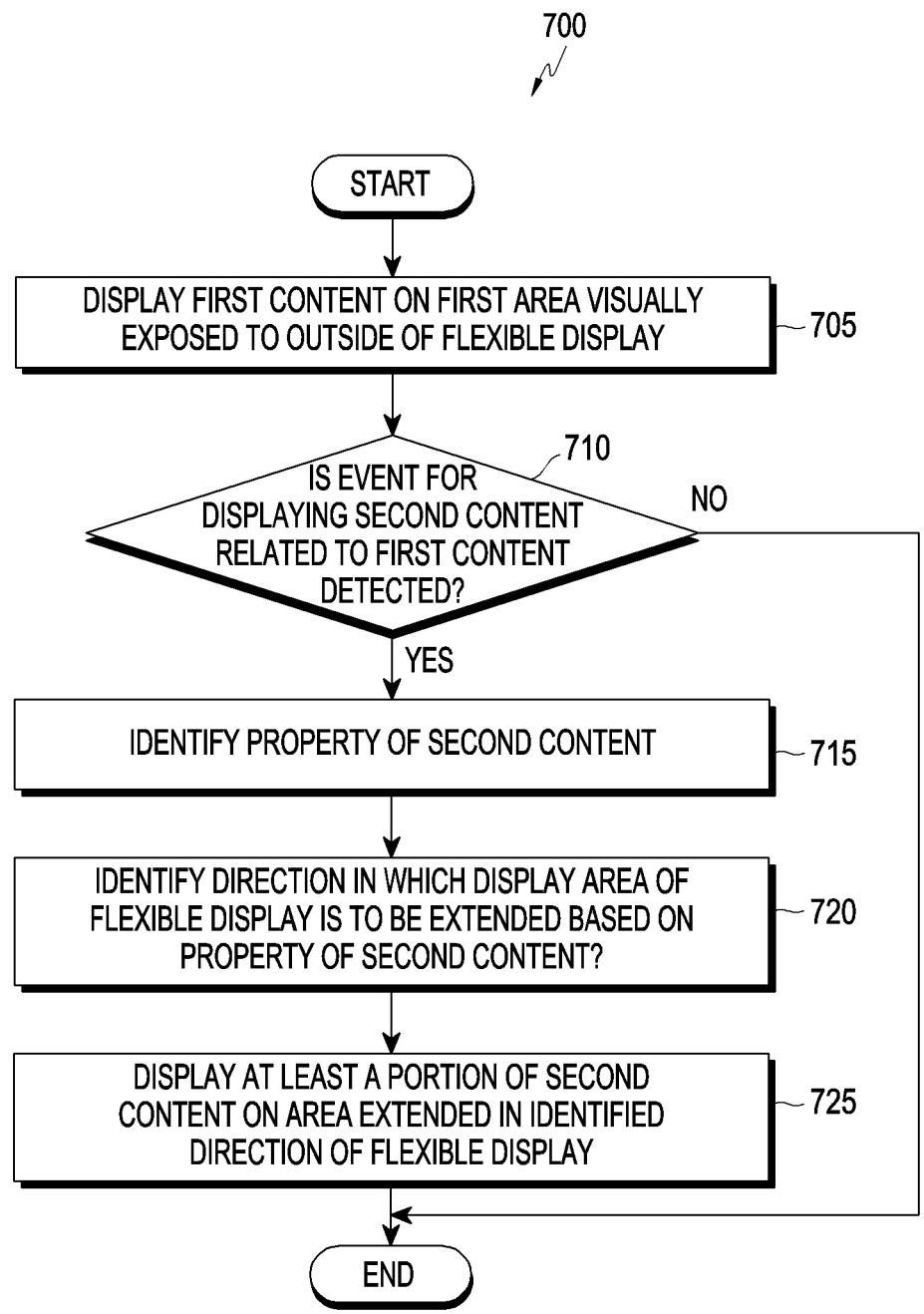
FIG. 7 is an operation flowchart illustrating an electronic device including a flexible display that is extended in a content-based direction according to an embodiment of the disclosure.

FIG. 7 is an operation flowchart 700 illustrating an electronic device including a flexible display that is extended in a content-based direction according to an embodiment of the disclosure. Referring to FIG. 7, an operating method may include operations 705 to 725. Each step/operation of the operating method of FIG. 7 may be performed by an electronic device (e.g., the electronic device 101 of FIG. 1 or the electronic device 601 of FIG. 6) or at least one processor (e.g., the processor 120 of FIG. 1 or the processor 620 of FIG. 6) of the electronic device. According to an embodiment, at least one of operations 705 to 725 may be omitted, the order of some operations may be changed, or another operation may be added.

Referring to FIG. 7, in operation 705, the electronic device 601 may display first content on a display area (e.g., a first area) of the flexible display 660, the flexible display including a display area, wherein the display area is extendable in one or more directions with respect to a housing of the electronic device by moving a portion of the flexible display through the housing to be visually exposed. According to an embodiment, the display area may correspond to a first area in a closed state in which the exposed portion of the flexible display 660 is the smallest. According to an embodiment, when at least one application is being executed, the first content displayed in the first area may be an execution screen of the application. Otherwise, if there is no application being executed, the first screen may be a home screen.

In operation 710, the electronic device 601 may identify whether an event for displaying second content related to the first content is detected. For example, when a user input (or user interaction) is received on the flexible display 660, the electronic device 601 may identify whether the received user input is a predetermined user input for displaying additional content. When the received user input is identified to be the predetermined user input for displaying the additional content, the user input may be detected as the event for displaying second content related to the first content.

According to an embodiment, the detecting of the event for displaying second content may include detecting an event for displaying the second content based on at least one of an input to an object related to the display of the second content displayed on the first area, a scroll input on a designed area in the first area, or a predetermined input.

In operation 715, the electronic device 601 may identify the attribute of the second content according to the detection of the event, and in operation 720, the electronic device 601 may identify a direction in which the flexible display 660 is to be extended based on the attribute of the second content.

According to an embodiment, the identifying of the direction in which the flexible display 660 is to be extended may include identifying a position corresponding to a predetermined area where the second content is to be displayed based on the first area and identifying the direction in which the flexible display is to be extended based on the identified position.

According to an embodiment, the identifying of the direction in which the flexible display 660 is to be extended may include identifying any one area of divided areas in the first area based on the predetermined area where the second content is to be displayed, and identifying the direction in which the flexible display is to be extended to correspond to the identified area.

According to an embodiment, the identifying of any one area of divided areas in the first area may include identifying any one area of the divided areas in the first area based on a position of an object related to the display of the second content displayed on the first area and the predetermined area where the second content is to be displayed.

According to an embodiment, at the time of the extension of the flexible display 660, the flexible display 660 may be manually extended by the user or automatically extended. According to an embodiment, a user configuration related to whether to display the second content in the extended area of the flexible display 660 may be previously stored. For example, the user may previously configure whether to display the second content in a second area of the flexible display by extending the flexible display 660.

According to an embodiment, when the display of the second content is configured to be activated in the extended area, the electronic device 601 may identify a direction in which the flexible display 660 is to be extended based on the user configuration.

According to an embodiment, when the display of the second content is configured to be deactivated in the second area, the electronic device 601 may overlap and display at least a portion of the second content on the first area based on the user configuration.

For example, when the display of the second content is configured to be deactivated, the electronic device 601 may not perform the extending of the flexible display 660 and may overlap and display the second content on the first content displayed on the first area while maintaining an exposed state of the first area of the flexible display 660.

In operation 725, the electronic device 601 may display at least a portion of the second content in the second area of the flexible display extended in the identified direction.

According to an embodiment, the displaying of the at least one of the second content may include displaying at least a portion of the second content in the second area of the flexible display extended in the identified direction together with the first content displayed in the first area. For example, the electronic device 601 may display second content corresponding to additional content in a separate area, that is, the extended area of the flexible display 660 while maintaining a current screen configuration in which the first content is displayed on the first area.

According to an embodiment, the displaying of the at least a portion of the second content may include identifying the arrangement direction of the electronic device 601 using the sensor 676 for sensing the arrangement direction of the electronic device 601, displaying at least a portion of the second content in the second area of the flexible display extended in the identified direction of a first direction or a second direction of the electronic device 601 when the arrangement direction of the electronic device 601 is a landscape orientation, and displaying at least a portion of the second content in the second area of the flexible display extended in the identified direction of a third direction or a fourth direction of the electronic device 601 when the arrangement direction of the electronic device 601 is a portrait orientation.

Figure 8A:
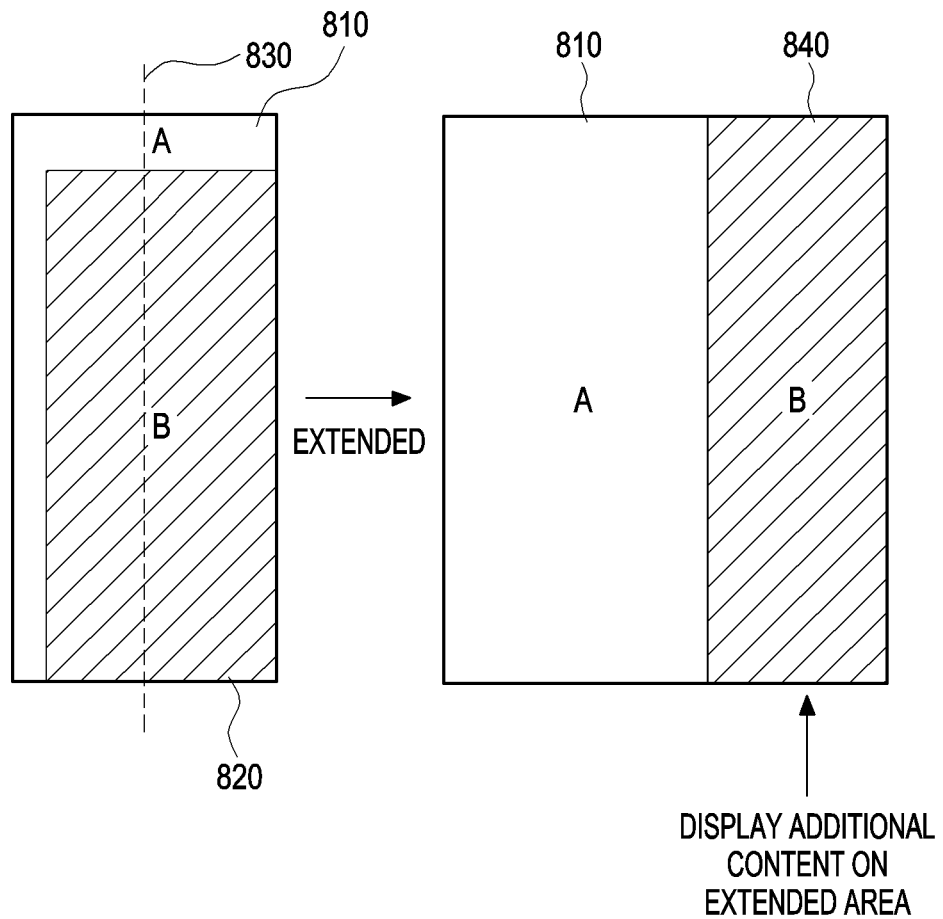
FIG. 8A is a diagram illustrating a state in which a flexible display is extended in a first direction to correspond to a first position of additional content when an electronic device is arranged vertically according to an embodiment of the disclosure.
Figure 8B:
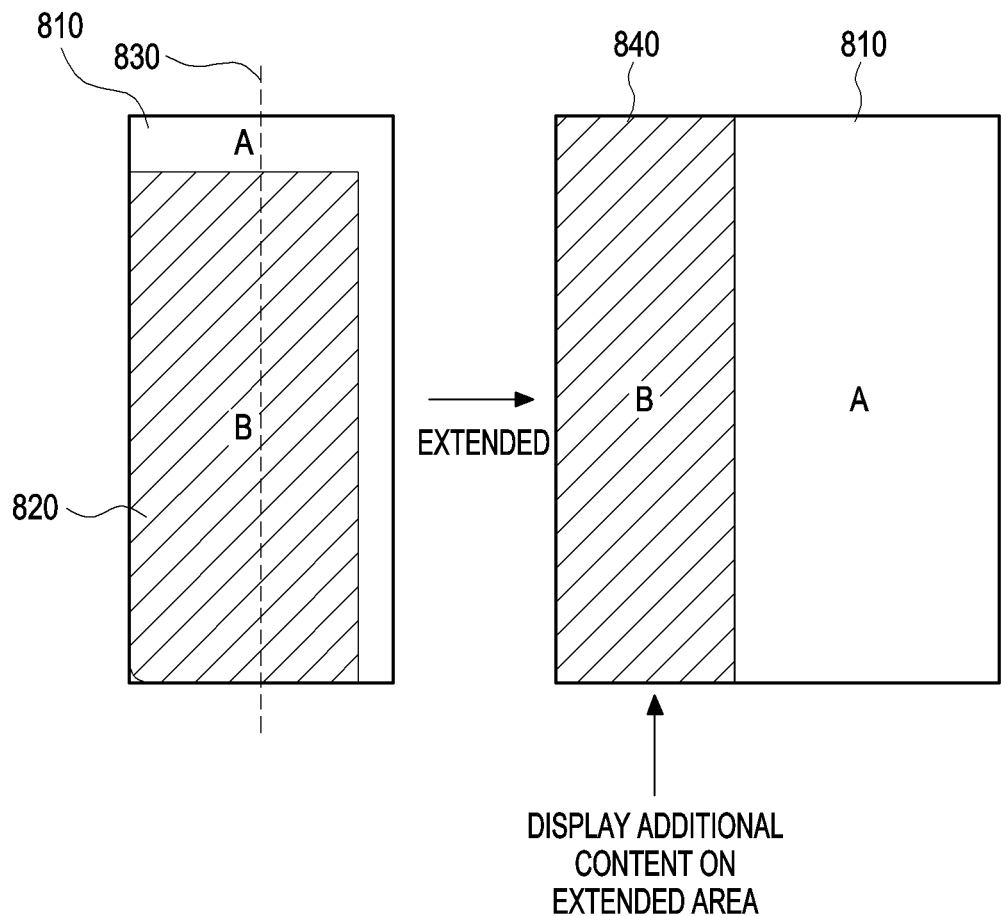
FIG. 8B is a diagram illustrating a state in which a flexible display is extended in a second direction to correspond to a second position of additional content when an electronic device is arranged vertically according to an embodiment of the disclosure.

FIG. 8A is a diagram illustrating a state in which a flexible display is extended in a first direction to correspond to a first position of additional content when an electronic device is arranged vertically according to an embodiment of the disclosure, and FIG. 8B is a diagram illustrating a state in which a flexible display is extended in a second direction to correspond to a second position of additional content when an electronic device is arranged vertically according to an embodiment of the disclosure.

Referring to FIGS. 8A and 8B, in a state in which the arrangement direction of the electronic device 601 is a portrait orientation, content A may be displayed in a first area 810 of the flexible display 660 of the electronic device 601. For example, the first area 810 of the electronic device 601 may be the entire exposed display area of the flexible display 660 in a state in which the electronic device 601 is closed. In addition, in a state in which the electronic device 601 is opened, the entire exposed display area of the flexible display 660 may include a first area 810 and a second area 840.

For example, when the first area 810 is referred to as a main area, the second area 840 corresponding to the extended area may be referred to as a sub area, and each area 810 or 840 may be a screen composed of layers.

According to various embodiments, when a user input for displaying additional content is detected, the electronic device 601 may identify a position (e.g., coordinate value) corresponding to a portion 820 in which content B is to be displayed based on the first area 810 in which the content A is displayed. In addition, the electronic device 601 may determine an extension direction of the flexible display 660 based on the identified position, and may display additional content in the extended area of the flexible display 660.

For example, content B may refer to a screen composed of a detailed page related to the content A, and may be composed of one layer. Here, when the flexible display 660 is expandable, the content B may be displayed in the sub area horizontally extended and connected to the main area where the content A is displayed.

According to an embodiment, as shown in FIGS. 8A and 8B, the electronic device 601 may extend the flexible display 660 to correspond to any one surface of a right side surface or a left side surface among surfaces forming the exterior of the electronic device 601. According to an embodiment, a position (or coordinate value) corresponding to the portion 820 in which the content B is to be displayed may be used to determine which direction to extend the flexible display in among at least one expandable direction. For example, when it is assumed that a layer corresponding to the content A and a layer corresponding to the content B are subsequently stacked, the electronic device 601 may compare the area occupied by the portion 820 where the content B is to be displayed with the area of the first area 810. For example, in a state in which the arrangement direction of the electronic device 601 is a portrait orientation, the first area 810 may be divided into two areas with respect to a reference line (or vertical axis) 830 crossing the center of the first area 810. The electronic device 601 may identify a direction of the portion where the content B is to be displayed by identifying which area contains more of the area occupied by the portion where the content B is to be displayed from the two divided areas. For example, as shown in FIG. 8A, when the portion where the content B is to be displayed is more included in the right area among the divided areas in the first area 810 with respect to the reference line 830, the electronic device 601 may determine the direction to be extended to be the right to correspond to the right area. Accordingly, when the electronic device 601 extends the flexible display 660 in the right direction, the size of the display area may be gradually increased (e.g., the right area of the display area is gradually extended), so that in the extended area, for example, at least a portion of the content B may be displayed in the second area 840 while the first area 810 is maintained.

On the other hand, as shown in FIG. 8B, when the portion where the content B is to be displayed is more included in the left area among the divided areas in the first area 810 with respect to the reference line 830, the electronic device 601 may determine the direction to be extended to be the left to correspond to the left area. Accordingly, when the electronic device 601 extends the flexible display 660 in the left direction, the size of the display area may be gradually increased (e.g., the left area of the display area is gradually extended), so that in the extended area, for example, at least a portion of the content B may be displayed in the second area 840 while the first area 810 is maintained.

As described above, when the electronic device 601 is vertically arranged, the electronic device 601 may extend the flexible display 660 in the left direction to correspond to a first position (e.g., the left side) of content to be additionally displayed among the vertically divided areas, and may extend the flexible display 660 in the right direction to correspond to a second position (e.g., the right side) of the content. When the flexible display 660 of the electronic device 601 is expandable in a plurality of directions, the extended direction of the flexible display 660 may be variously determined according to an arrangement direction of the electronic device 601 among the plurality of expandable directions and the position of content to be additionally displayed. For example, in FIGS. 8A and 8B, when the flexible display 660 is expandable in two directions, the flexible display 660 can be extended in two directions (e.g., one of left or right and one of upward or downward) rather than both directions including left and right directions.

Figure 9A:
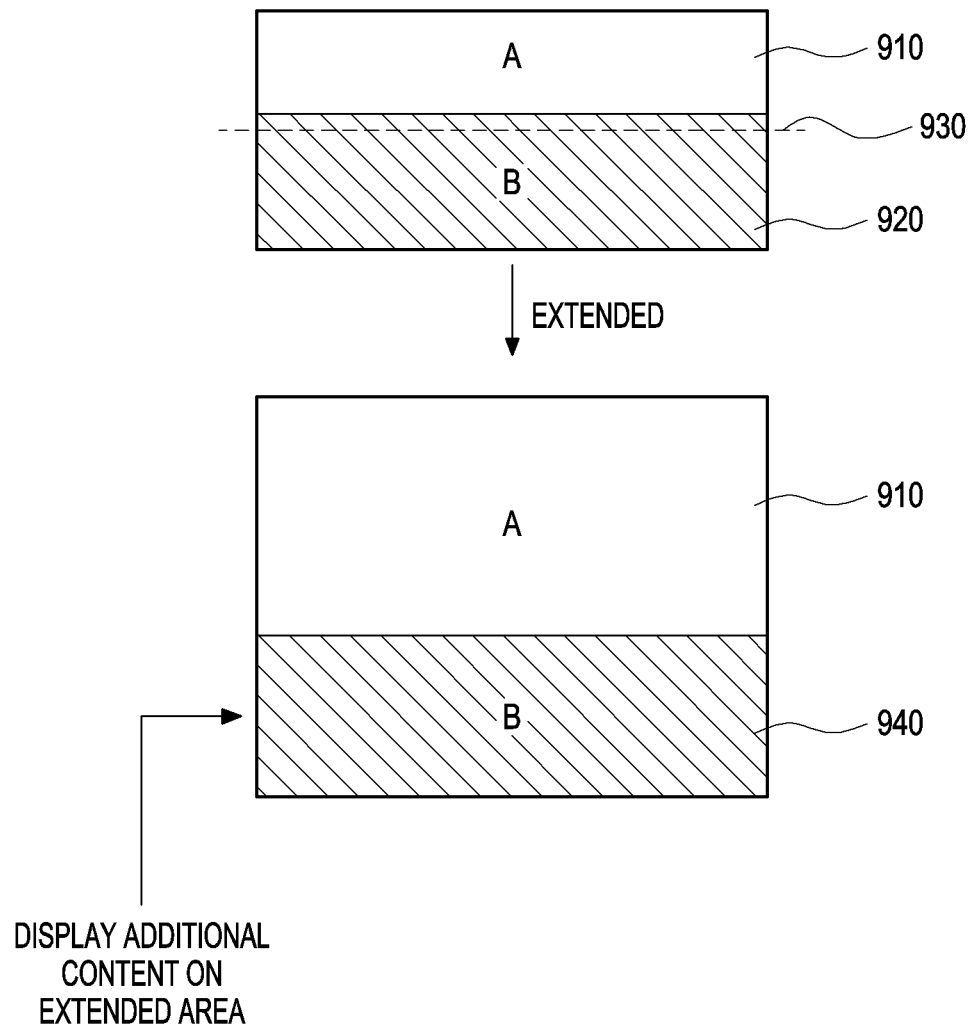
FIG. 9A is a diagram illustrating a state in which an electronic device is extended in a third direction to correspond to a third position of additional content when the electronic device is arranged horizontally according to an embodiment of the disclosure.
Figure 9B:
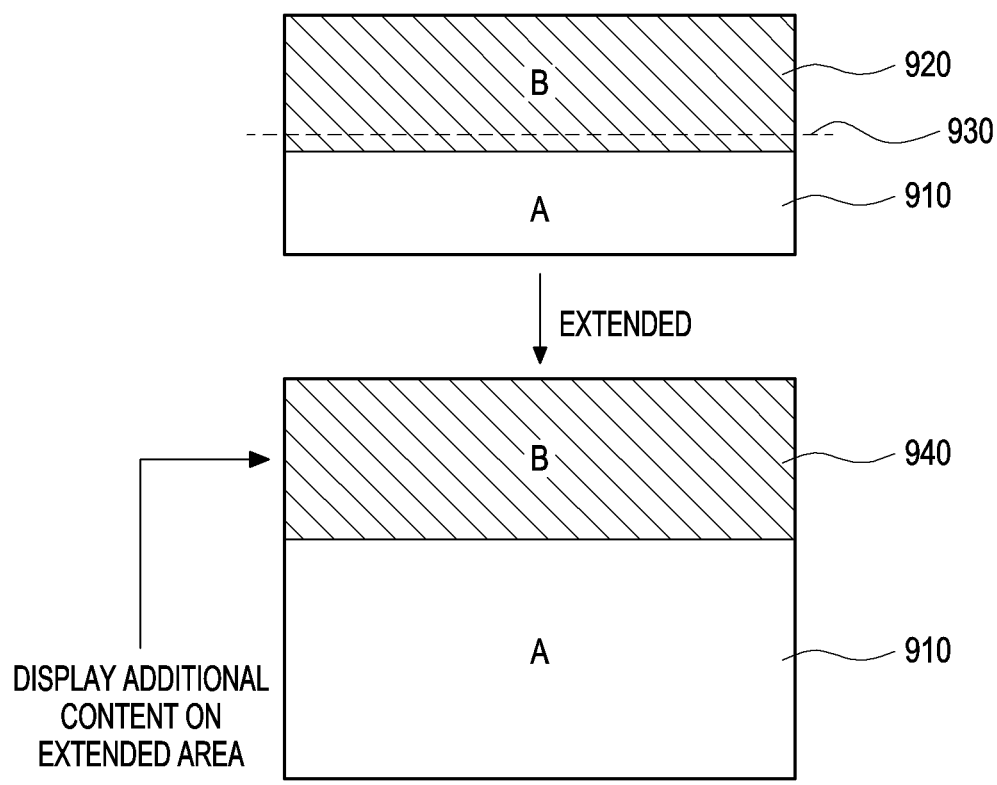
FIG. 9B is a diagram illustrating a state in which an electronic device is extended in a fourth direction to correspond to a fourth position of additional content when the electronic device is arranged horizontally according to an embodiment of the disclosure.

FIG. 9A is a diagram illustrating a state in which an electronic device is extended in a third direction to correspond to a third position of additional content when the electronic device is arranged horizontally according to an embodiment of the disclosure, and FIG. 9B is a diagram illustrating a state in which an electronic device is extended in a fourth direction to correspond to a fourth position of additional content when the electronic device is arranged horizontally according to an embodiment of the disclosure.

Referring to FIG. 9A, when a portion 920 where content B is to be displayed is more included in a lower area of divided areas in a first area 910 with respect to a reference line 930 in the first area 910, the electronic device 601 may determine a direction to be extended to be a downward direction to correspond to the lower area. Accordingly, when the electronic device 601 extends the flexible display 660 in the downward direction, the size of the display area may be gradually increased (e.g., the lower area of the display area is gradually extended), so that at least a portion of the content B may be displayed in a second area 940 that is an extended area while the first area 910 is maintained.

On the other hand, referring to FIG. 9B, when the portion 920 where content B is to be displayed is more included in an upper area of divided areas in the first area 910, the electronic device 601 may determine the direction to be extended to be an upward direction to correspond to the upper area. Accordingly, when the electronic device 601 extends the flexible display 660 in the upward direction, the size of the display area may be gradually increased (e.g., the upper area of the display area is gradually extended), so that at least a portion of the content B may be displayed in the second area 940 that is the extended area while the first area 910 is maintained.

As described above, when the flexible display 660 of the electronic device 601 is expandable in a plurality of directions, the extended direction of the flexible display 660 may be variously determined according to an arrangement direction of the electronic device 601 among the plurality of expandable directions and a location of content to be additionally displayed. For example, in FIGS. 9A and 9B, when the flexible display 660 is expandable in two directions, the flexible display 660 can be extended in two directions (e.g., one of left or right and one of upward or downward) rather than both directions including the downward and upward directions.

Figure 10:
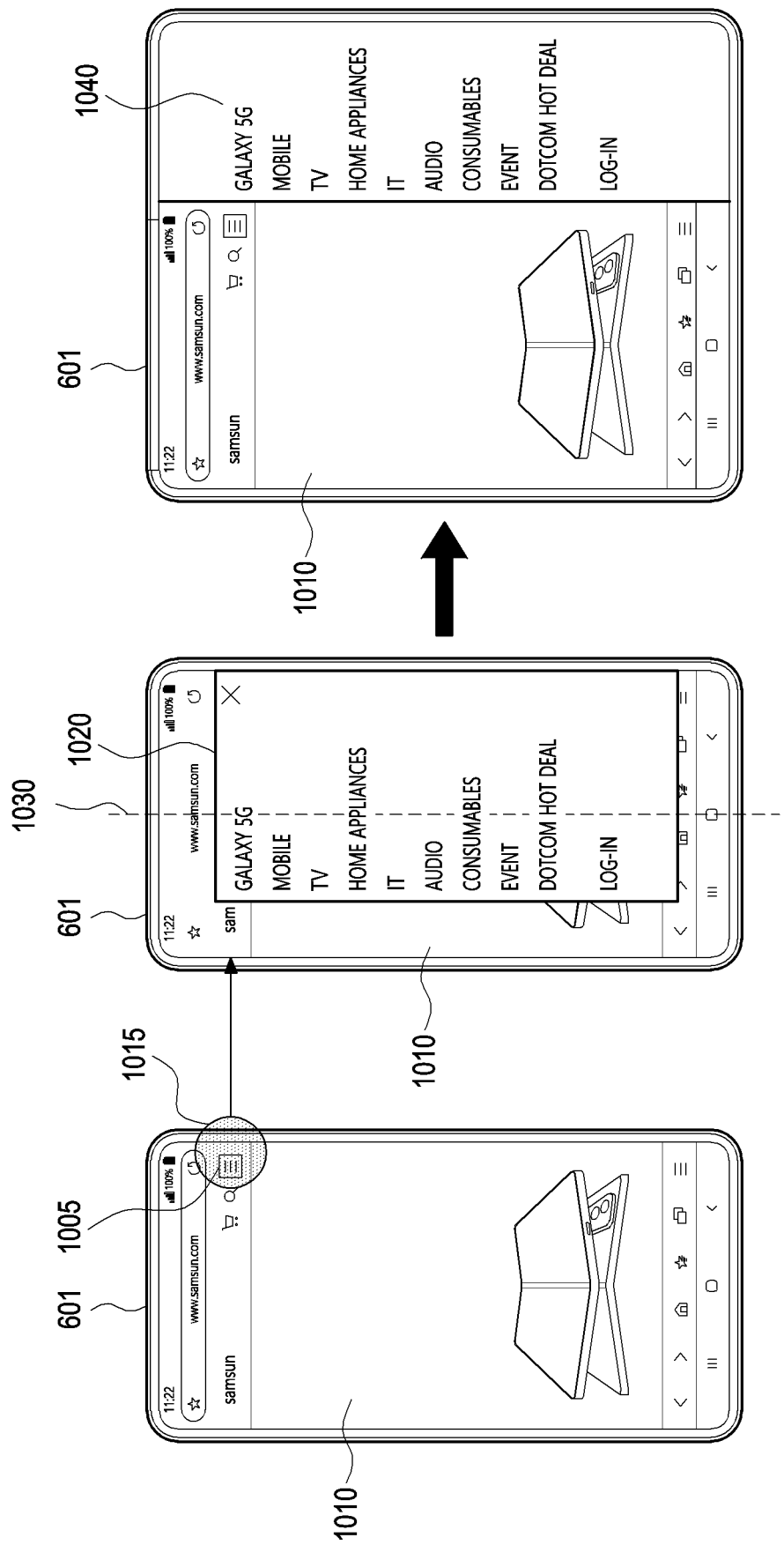
FIG. 10 is a diagram illustrating a method for identifying a location of additional content when an electronic device is arranged vertically according to an embodiment of the disclosure.

FIG. 10 is a diagram illustrating a method for identifying a location of additional content when an electronic device is arranged vertically according to an embodiment of the disclosure.

Referring to FIG. 10, when a first area 1010 of the flexible display 660 is exposed to the outside while the electronic device 601 is closed in the portrait mode, first content may be displayed on the first area 1010. According to an embodiment, information that can be moved to a detailed page related to the first content may be displayed on the first area 1010 displaying the first content using, for example, a selectable visual element (or visual object) 1005, thereby inducing a user's selection 1015.

In response to the user's selection 1015, the electronic device 601 may identify an area corresponding to a position 1020 of a portion where second content corresponding to the detailed page related to the first content is to be displayed among divided areas with respect to a reference line 1030. For example, based on the area occupied by the portion where the second content is to be displayed, when the portion where the second content is to be displayed is included in the right area of the first area 1010, the electronic device 601 may determine the extended direction to be the right direction to correspond to the right side area. In this case, when the arrangement direction of the electronic device 601 is a portrait orientation, the electronic device 601 may display at least a portion of the second content in an area 1040 extended in an identified direction from a first direction or a second direction (e.g., left or right direction) of the electronic device 601.

Figure 11:
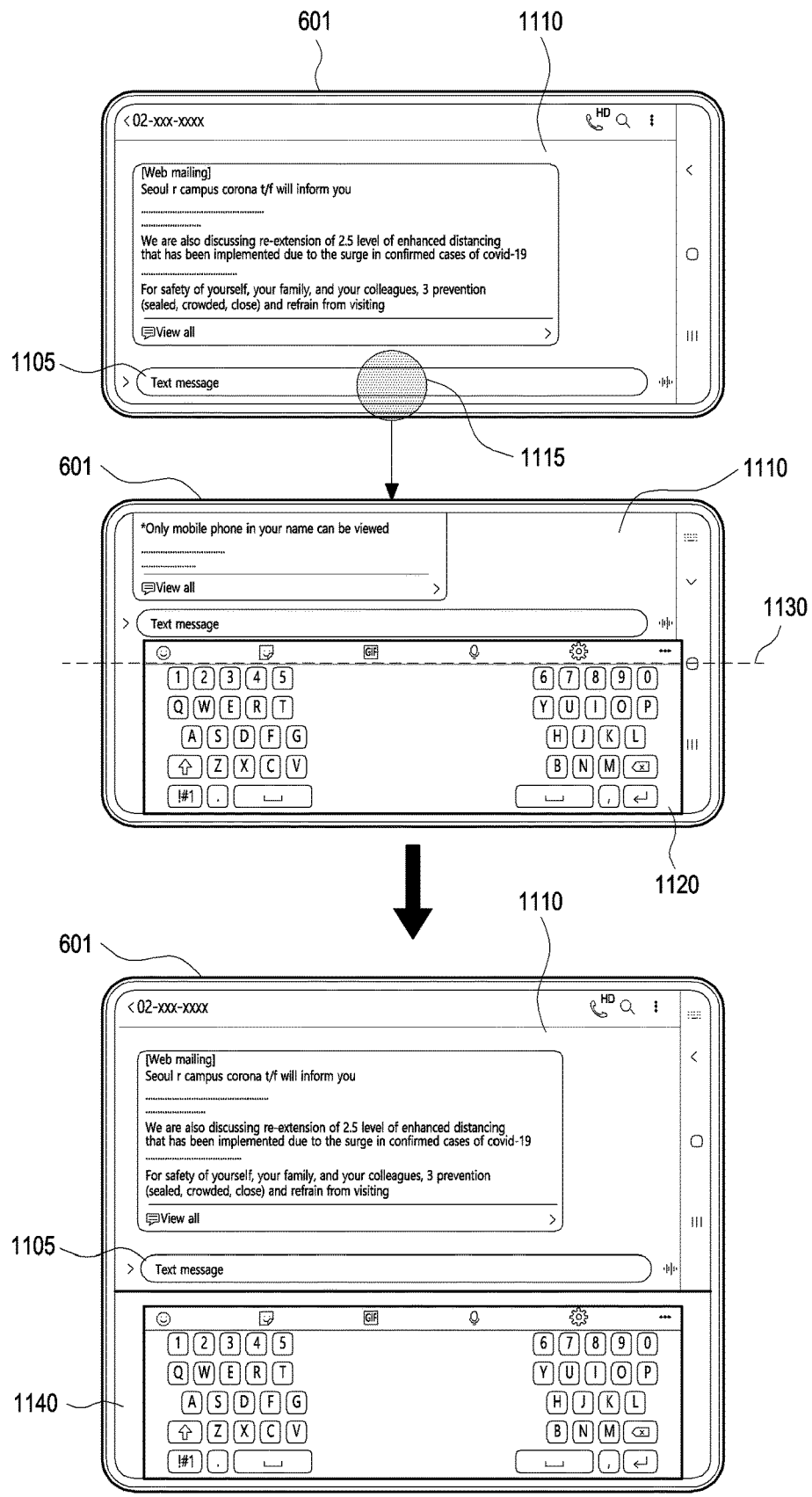
FIG. 11 is a diagram illustrating a method for identifying a location of additional content when an electronic device is arranged horizontally according to an embodiment of the disclosure.

FIG. 11 is a diagram illustrating a method for identifying a location of additional content when an electronic device according to is arranged horizontally according to an embodiment of the disclosure.

Referring to FIG. 11, when first content is displayed in a first area 1110 of the flexible display 660 while the electronic device 601 is closed in a landscape mode, information that can be moved to a detailed page related to the first content may be displayed using a selectable visual element (or visual object) 1105, thereby inducing a user's selection 1115. For example, in a state in which an execution screen of a text application is displayed in the first area 1110 as the first content, when the user's selection 1115 to a text input window is detected, a keyboard area 1120 may be additionally displayed. For example, when the position of the keyboard area 1120 corresponding to content to be additionally displayed is more included in a lower area with respect to a reference line 1130 dividing the first area 1110 into two on the horizontal axis, the electronic device 601 may extend the flexible display 660 in a downward direction. Accordingly, the electronic device 601 may display at least a portion of the second content in an area 1140 extended in a downward direction of the electronic device 601. For example, in relation to the first content corresponding to text message content of the text application, second content for keyboard input may be displayed.

Figure 12:
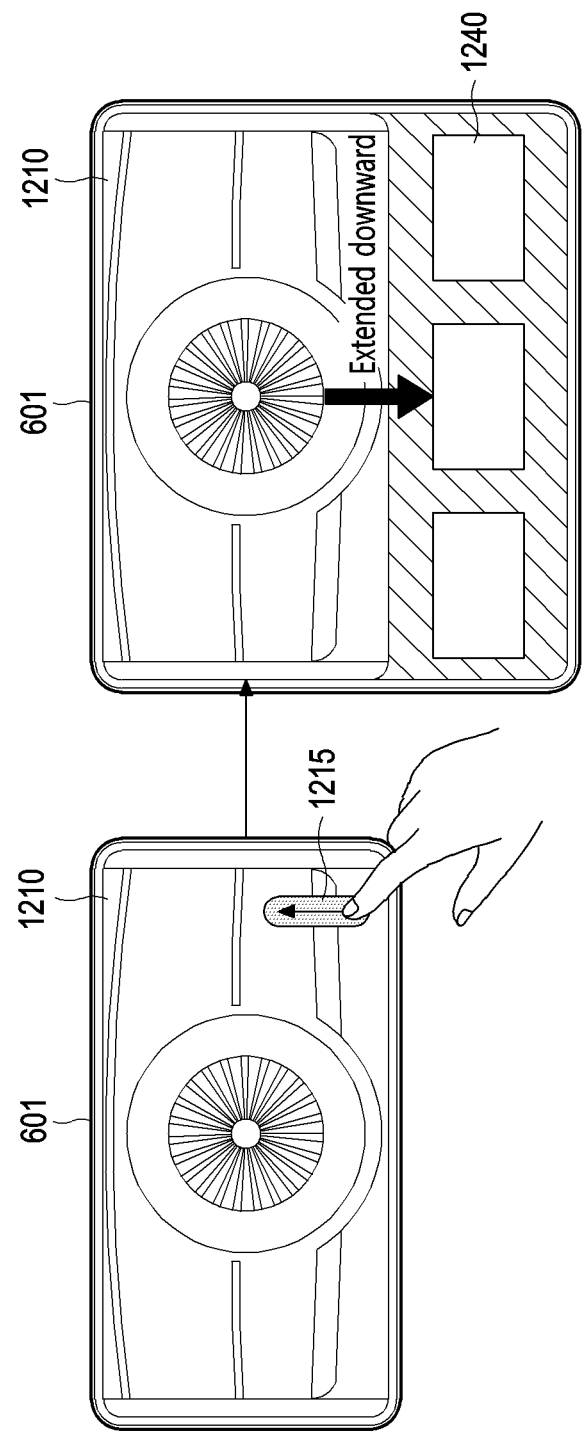
FIG. 12 is a diagram illustrating a scrolling method for displaying additional content according to an embodiment of the disclosure.

FIG. 12 is a diagram illustrating a scrolling method for displaying additional content according to an embodiment of the disclosure.

Referring to FIG. 12, when a playback screen of a video application is displayed on a first area 1210 of the flexible display 660 in a closed state, the electronic device 601 may display at least a portion of additional content related to a video in an extended area 1240 while the video playback is maintained on the first area 1210 in a direction corresponding to a scroll input 1215. According to an embodiment, the additional content displayed on the extended area 1240 may include content provided along with the video playback screen in the portrait mode. According to an embodiment, the electronic device 601 has been described using the video playback screen in the landscape mode as an example, but when another application execution screen is displayed, the scroll input 1215 within a designated area in the first area 1210 may be regarded as an input for displaying the additional content.

Figure 13:
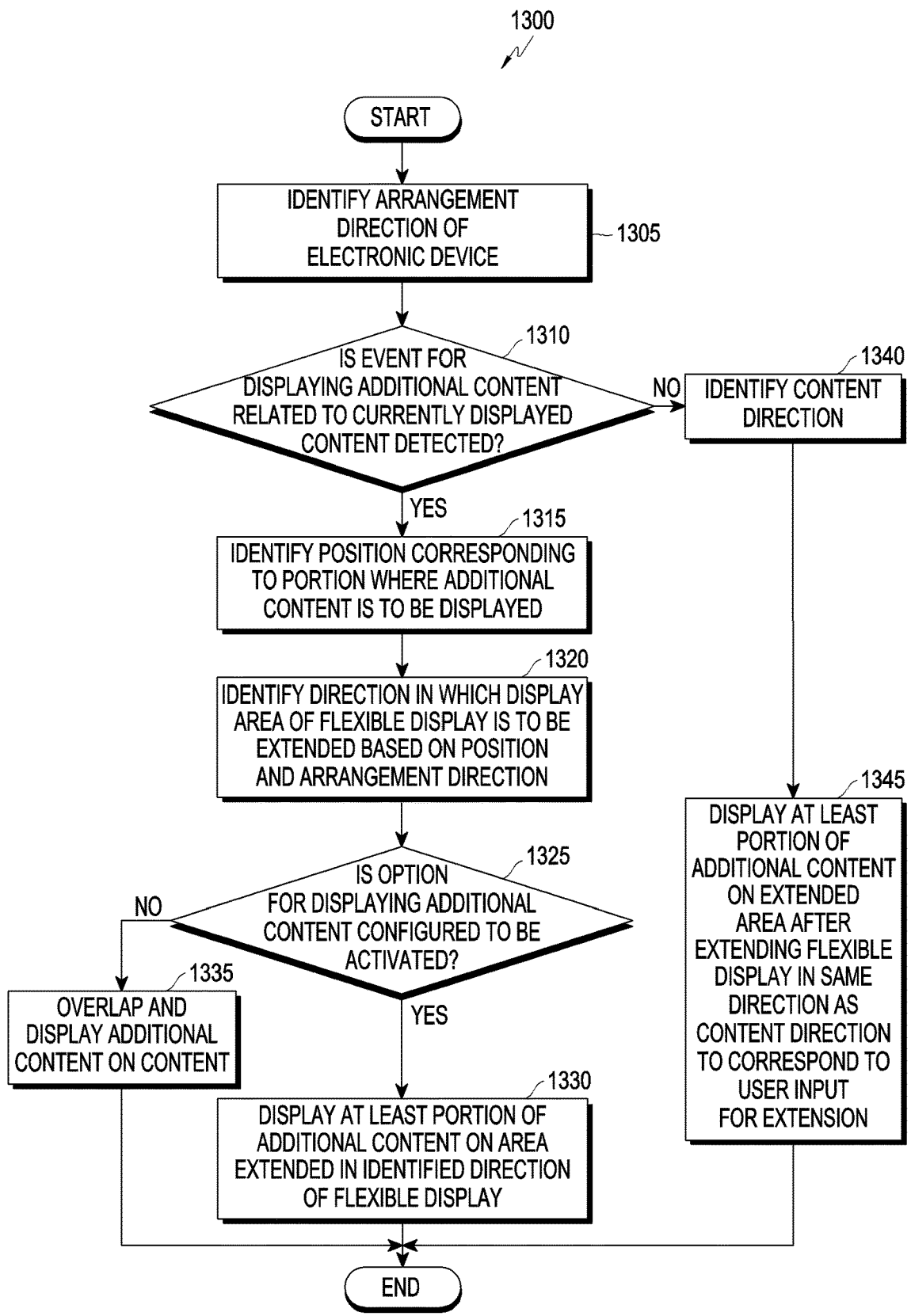
FIG. 13 is a detailed operation flowchart illustrating an electronic device including a flexible display that is extended in a content-based direction according to an embodiment of the disclosure.

FIG. 13 is a detailed operation flowchart 1300 illustrating an electronic device including a flexible display that is extended in a content-based direction according to an embodiment of the disclosure. Referring to FIG. 13, the electronic device 601 may be in a state of displaying content on a display area of the flexible display 660 in a closed state. Each step/operation of an operating method of FIG. 13 may be performed by an electronic device (e.g., the electronic device 101 of FIG. 1 or the electronic device 601 of FIG. 6) or at least one processor (e.g., the processor 120 of FIG. 1 or the processor 620 of FIG. 6) of the electronic device. According to an embodiment, at least one of operations 1305 to 1345 may be omitted, the order of some operations may be changed, or another operation may be added. For example, although operation 1305 for identifying the arrangement direction is illustrated as being performed before operation 1310 in FIG. 13, operation 1305 may be implemented to be performed after operation 1310. In addition, although operation 1325 for identifying whether an option for displaying additional content is configured to be activated is illustrated as being performed after operation 1320, operation 1325 may be implemented to be performed following operation 1310.

Referring to FIG. 13, in operation 1305, the electronic device 601 may identify the arrangement direction of the electronic device 601. For example, the electronic device 601 may use at least one sensor (e.g., the sensor 676) to identify whether content is horizontally or vertically arranged while the content is being displayed.

In operation 1310, the electronic device 601 may identify whether an event for displaying additional content related to content being displayed is detected. For example, when a user input (or user interaction) is received on the flexible display 660, the electronic device 601 may identify whether the received user input is the event for displaying additional content.

In operation 1315, in response to the event for displaying the additional content, the electronic device 601 may identify a position corresponding to a portion where the additional content is to be displayed. In operation 1320, the electronic device 601 may identify a direction in which the display area of the flexible display is to be extended based on the position and arrangement direction. For example, when the arrangement direction of the electronic device 601 is a portrait orientation and the position corresponding to the portion where the additional content is to be displayed occupies more of the left portion of the content being displayed, the electronic device 601 may determine the left direction of the left direction or the right direction to be the direction to be extended. In addition, when the arrangement direction of the electronic device 601 is a landscape orientation and the position corresponding to the portion where the additional content is to be displayed occupies more of the upper portion of the content being displayed, the electronic device 601 may determine the upward direction of the downward direction or the upward direction to be the direction to be extended.

In operation 1325, the electronic device 601 may identify whether an option for displaying the additional content is configured to be activated. When the option is configured to be activated, in operation 1330, the electronic device 601 may display at least a portion of the additional content in the extended area in the identified direction of the flexible display 660. On the other hand, when the option is configured to be deactivated, in operation 1335, the electronic device 601 may overlap and display the additional content on the content being displayed. For example, the electronic device 601 may generate a transparent or opaque layer without extension of the flexible display 660 to display the additional content on the content in a floating form. Here, the additional content displayed in the floating form may have, for example, a form in which a portion of the content is overlapped by the additional content.

Meanwhile, when the event for displaying the additional content is not detected, for example, when a user input does not correspond to the event for displaying the additional content, in operation 1340, the electronic device 601 may identify a direction of the content. For example, the electronic device 601 may identify the content direction based on a code value on a system or may identify the content direction based on a script in the case of web content. The flexible display 660 may be extended by the user in a state in which the content direction is identified. For example, the user may manually pull one side surface of the flexible display 660 or may command to automatically perform a sliding-out operation. That is, the operation of extending the flexible display 660 may be automatically performed using, for example, a driving module (e.g., the driving module 665 of FIG. 6) disposed in the housing of the electronic device 601 through a touch input. In addition, the operation of extending the flexible display 660 may be performed manually by a force directly and continuously applied by the user.

Accordingly, when a user input for manually expanding the flexible display 660 is received, in operation 1345, the electronic device 601 may extend the flexible display 660 in the same direction as the content direction in response to the user input for the expansion, and may then display at least a portion of the additional content in the extended area. Here, a method of determining the direction to be extended corresponding to the content direction will be described later with reference to FIGS. 18A and 18B.

Figure 14:
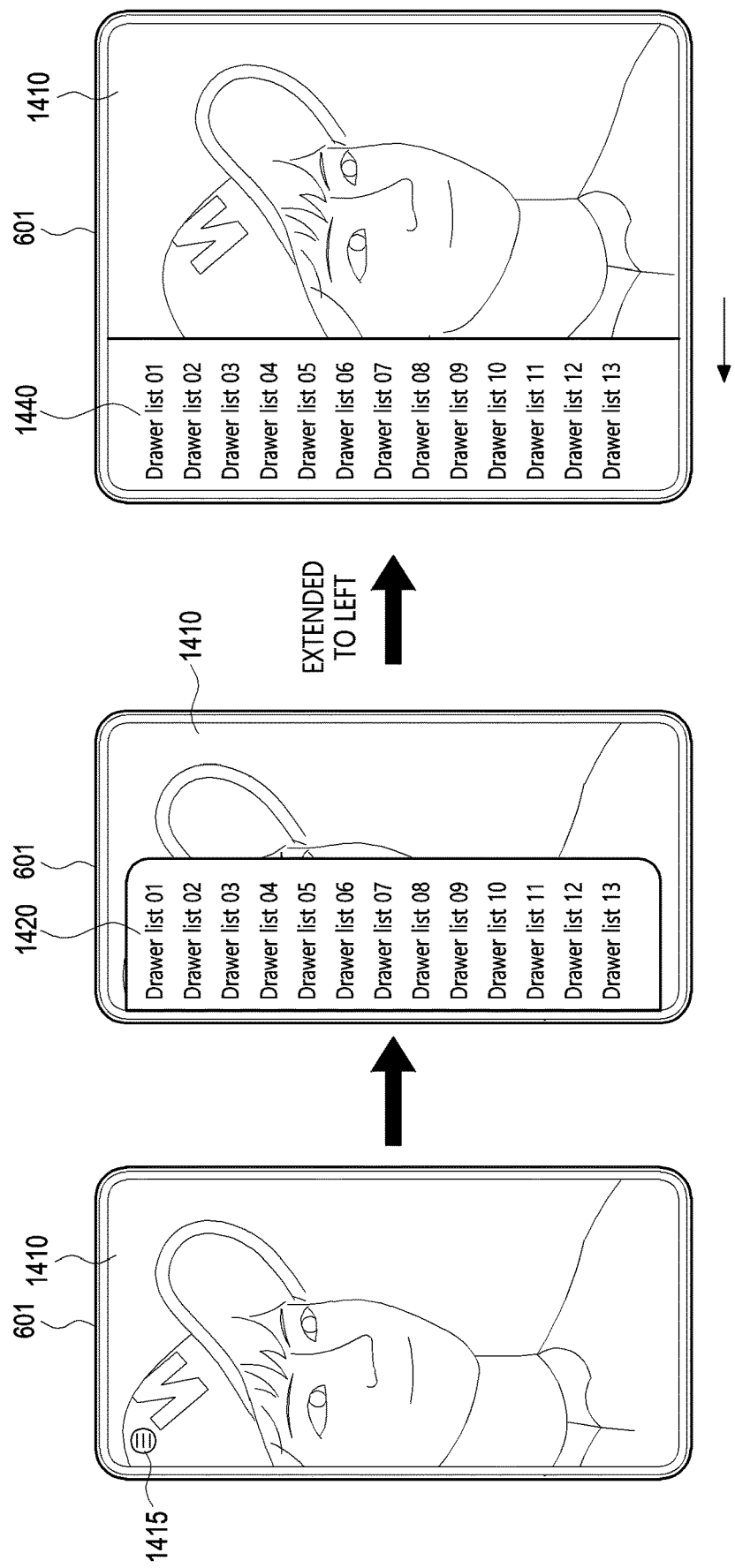
FIG. 14 is a diagram illustrating an indicator method for displaying additional content according to an embodiment of the disclosure.

FIG. 14 is a diagram illustrating an indicator method for displaying additional content according to an embodiment of the disclosure.

Referring to FIG. 14, the electronic device 601 may provide a guide object 1415 related to a display of additional content while content is displayed on a display area 1410 of the flexible display 660 in a closed state of the electronic device 601. For example, the guide object 1415 may be an object for inducing the display of the additional content related to the content displayed on the flexible display 660.

According to an embodiment, the electronic device 601 may provide additional content (or detailed page) 1420 related to content being displayed in response to a selection (or a user input) with respect to the guide object 1415. In this case, when it is identified that, for example, the position of the additional content 1420 is overlapped and displayed on the left side of the display area 1410 as shown in FIG. 14 before the operation of extending the flexible display 660 is started, as the additional content is temporarily overlapped with the content on the display area 1410 and displayed and the flexible display 660 is gradually extended in an identified extended direction (e.g., the left direction), the electronic device 601 may display at least a portion of the additional content in the extended area 1440.

Figure 15:
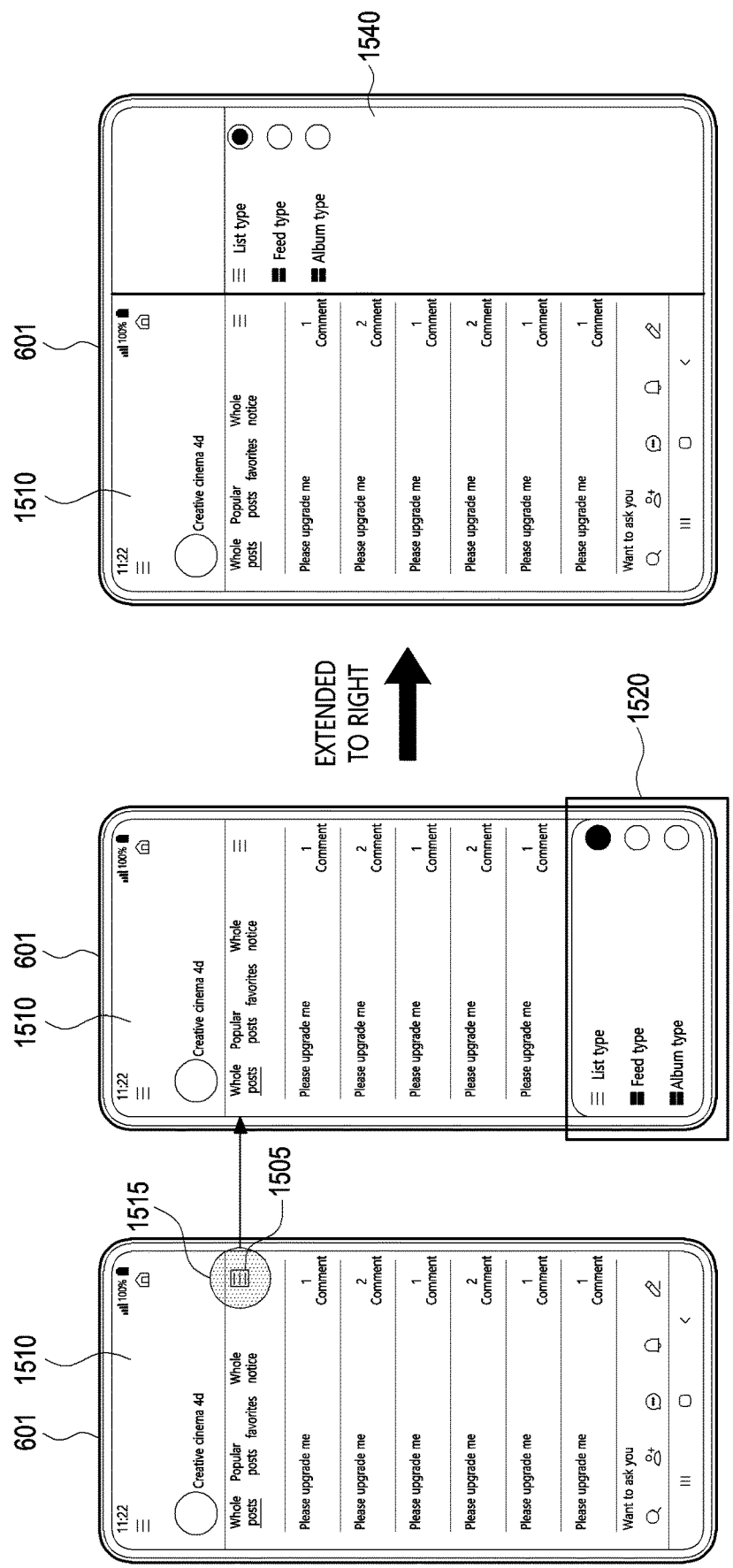
FIG. 15 is a diagram illustrating an extended state of a flexible display to correspond to a position of an indicator for displaying additional content according to an embodiment of the disclosure.

FIG. 15 is a diagram illustrating an extended state of a flexible display to correspond to a position of an indicator for displaying additional content according to an embodiment of the disclosure.

Referring to FIG. 15, the electronic device 601 may provide a guide object 1505 related to a display of additional content while content is displayed on a display area (e.g., first area) 1510 of the flexible display 660 in a closed state of the electronic device 601. For example, information that can be moved to a detailed page related to content being displayed on the display area 1510 may be displayed using a selectable visual element (or guide object 1505), thereby inducing a selection 1515 of the user.

In response to the selection 1515 of the user, the electronic device 601 may identify an area corresponding to a position 1520 where second content corresponding to the detailed page related to the content is to be displayed. In this case, when it is difficult to identify the position where the additional content is to be displayed in a state in which the arrangement direction of the electronic device 601 is a portrait orientation as shown in FIG. 15, for example, when it is difficult to distinguish an area more occupied by the additional content among vertically divided areas (e.g., left side area or right side area) of the display area 1510, the extended area may be identified based on the position of the guide object 1505.

For example, when the position of the guide object 1505 is located on the right side of the display area 1510, the electronic device 601 may determine the extended direction to be the right direction to correspond to the position of the guide object 1505. Accordingly, as shown in FIG. 15, the electronic device 601 may display at least a portion of the additional content in an area 1540 extended in the right side together with the content being displayed on the first area 1510.

Figure 16:
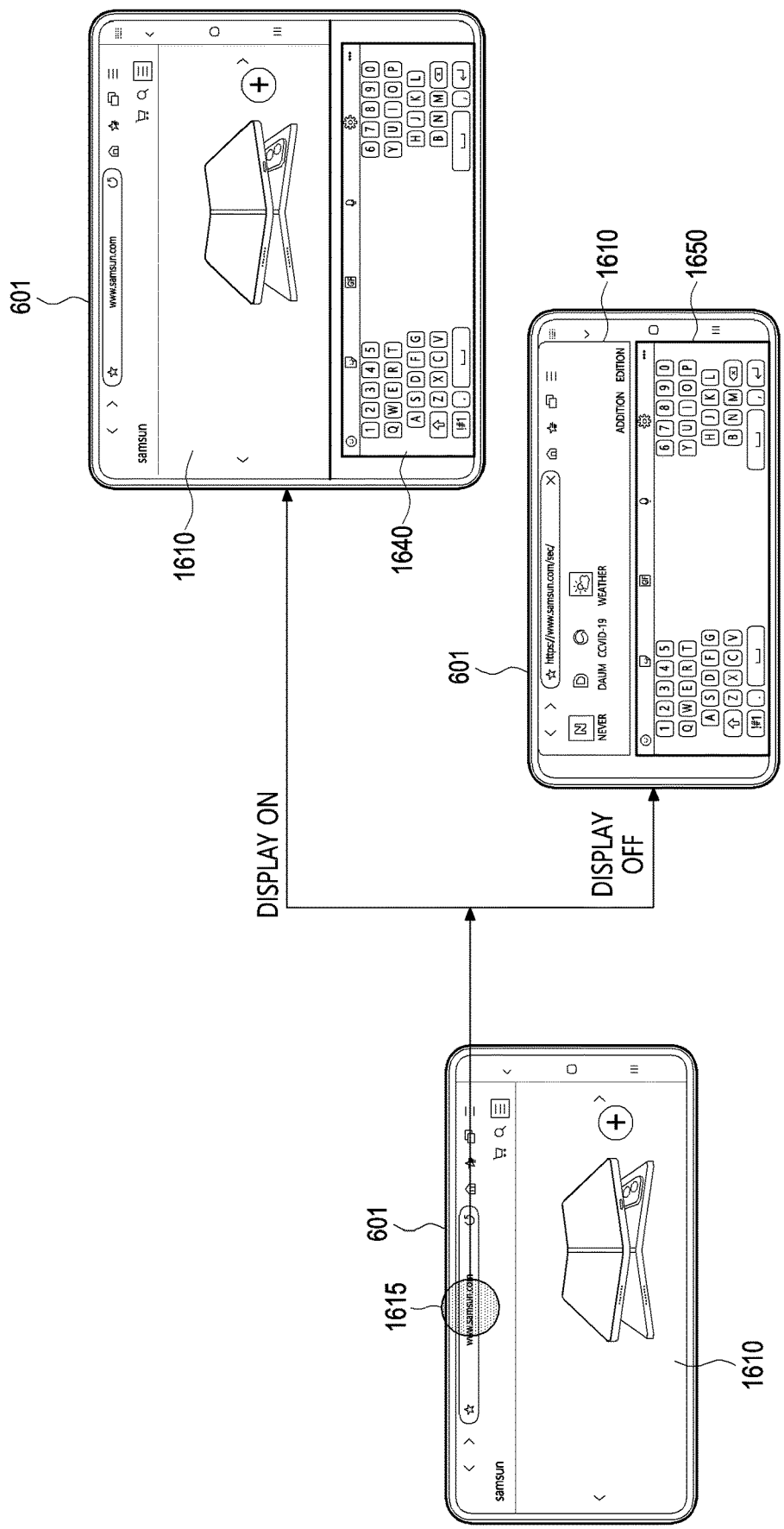
FIG. 16 is a diagram illustrating a display method of additional content according to whether additional content is displayed when an electronic device is arranged horizontally according to an embodiment of the disclosure.
Figure 17:
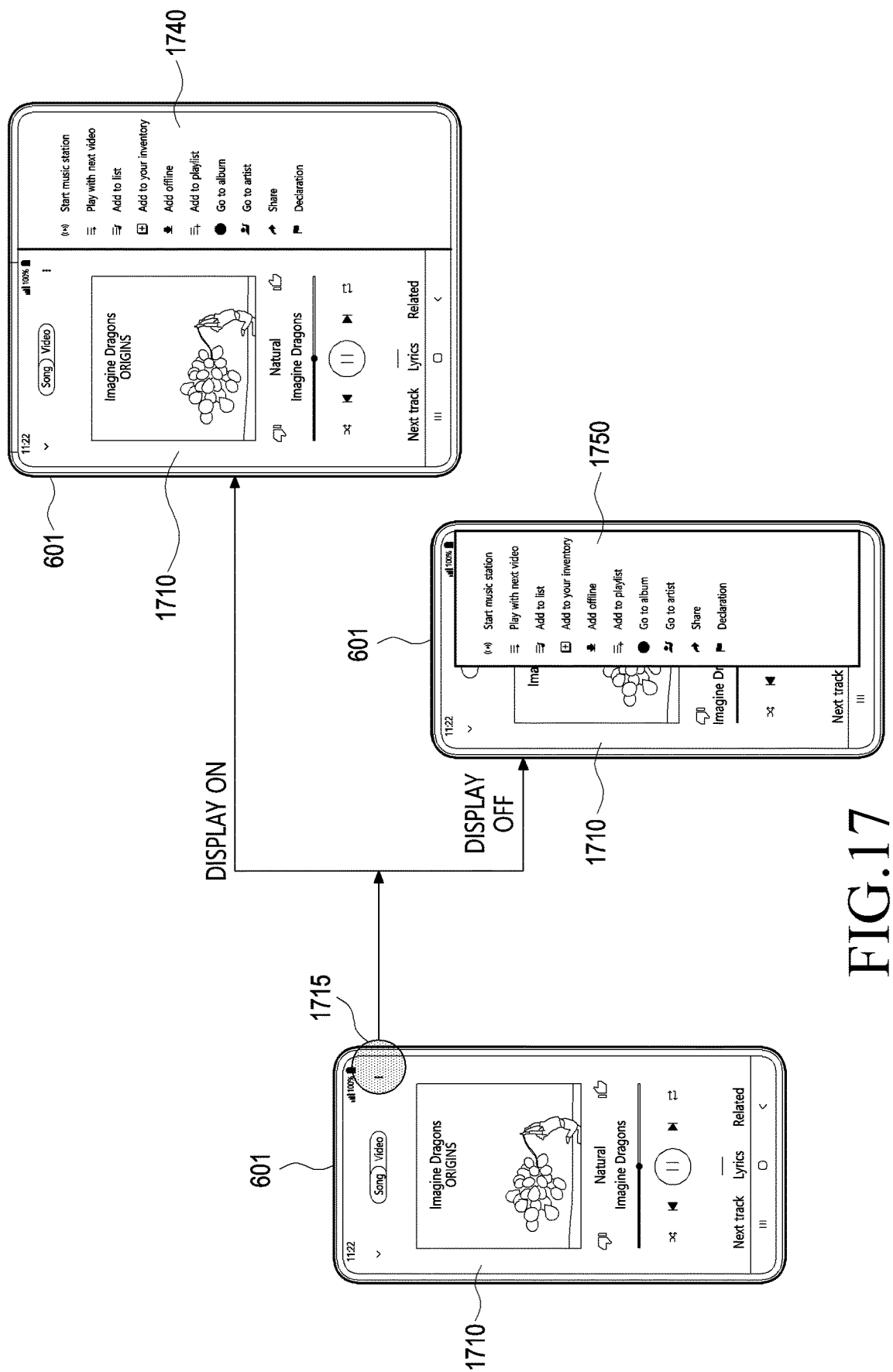
FIG. 17 is a diagram illustrating a display method of additional content according to whether additional content is displayed when an electronic device is arranged vertically according to an embodiment of the disclosure.

FIG. 16 is a diagram illustrating a display method of additional content according to whether additional content is displayed when an electronic device is arranged horizontally according to an embodiment of the disclosure, and FIG. 17 is a diagram illustrating a display method of additional content according to whether additional content is displayed when an electronic device is arranged vertically according to an embodiment of the disclosure.

FIG. 16 illustrates a case in which first content is displayed in a first area 1610 in a closed state of the flexible display 660 while the electronic device 601 is horizontally arranged, and FIG. 17 illustrates a case in which first content is displayed on a first area 1710 in a closed state of the flexible display 660 while the electronic device 601 is vertically arranged.

Referring to FIGS. 16 and 17, when user inputs 1615 and 1715 for displaying additional content in association with first content are received, the electronic device 601 may determine whether to extend the flexible display 660 to display the additional content. To this end, the electronic device 601 may determine whether to extend the flexible display 660 based on information configured in advance by the user in relation to whether to extend the flexible display 660. According to an embodiment, the electronic device 601 may store a user configuration related to whether to display the additional content in the extended area of the flexible display 660 in a memory (e.g., the memory 630 of FIG. 6).

For example, when the user configuration is achieved in which an option for displaying the additional content in the extended area is activated, for example, "ON", the electronic device 601 may extend the flexible display 660 to display a display of the additional content. Accordingly, the electronic device 601 may display the additional content in the extended areas 1640 and 1740 while the display of the content on the first area 1610 is maintained.

On the other hand, when the user configuration is achieved in which the option is deactivated, for example, "OFF", the electronic device 601 may overlap and display at least a portion 1650 or 1750 of the additional content on the content being displayed in the first area 1610 or 1710 without extending the flexible display 660.

Figures 18A, 18B:
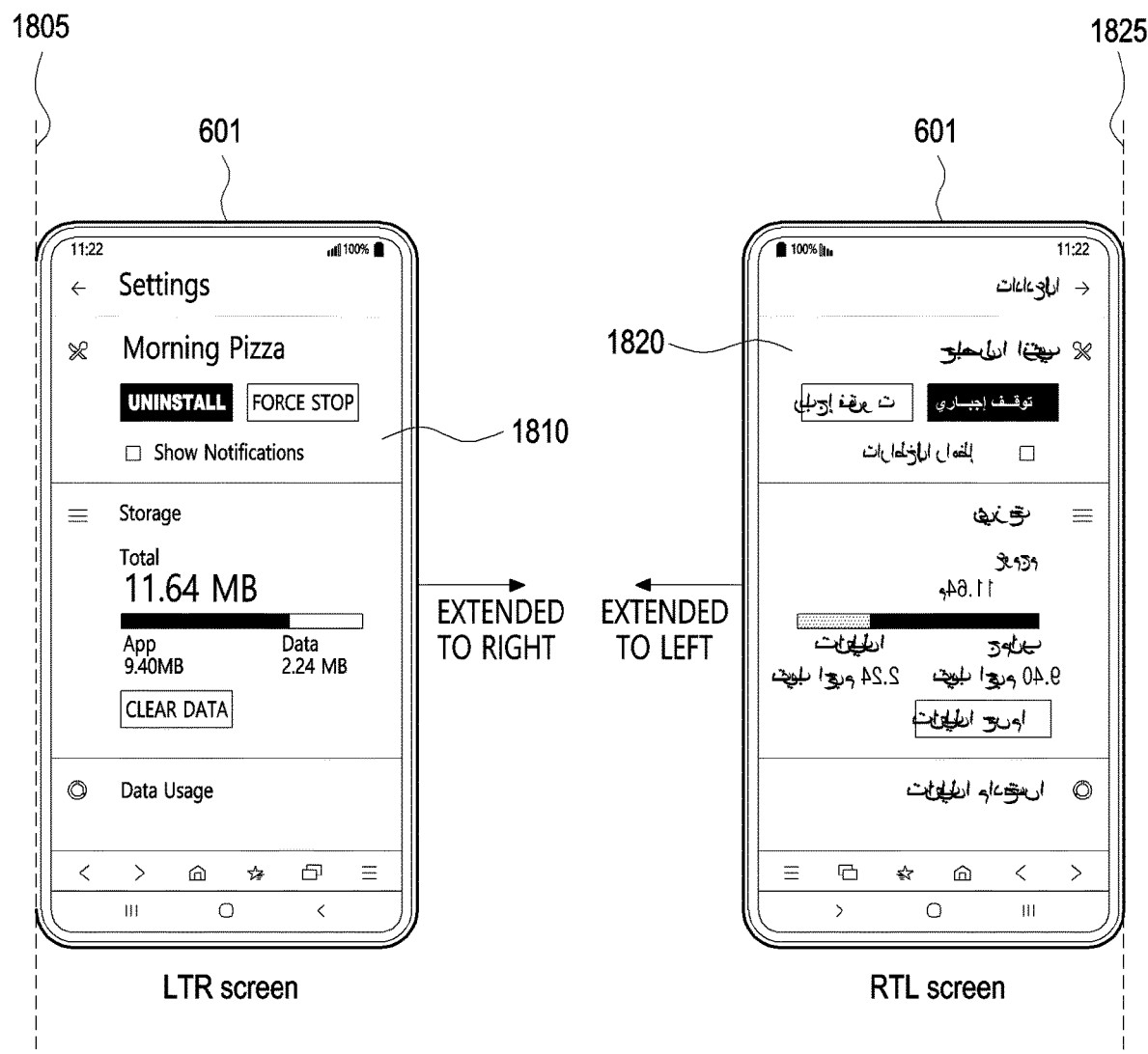
FIGS. 18A and 18B are diagrams illustrating a state in which a flexible display is extended in a direction corresponding to a content display direction at the time of extension to correspond to a user input according to an embodiment of the disclosure.

FIGS. 18A and 18B are diagrams illustrating a state in which a flexible display is extended in a direction corresponding to a content display direction at the time of extension to correspond to a user input according to an embodiment of the disclosure.

Referring to FIGS. 18A and 18B, a content direction may be largely divided into a left to right (LTR) direction and a right to left (RTL) direction. For example, the LTR direction is a content direction in a country using a language that is written and read from left to right, and the representative example may include English, Korean, and Spanish. In addition, the RTL direction is a content direction in a country using a language that is written and read from right to left, and the representative example may include Arabic or Hebrew. For example, when the user manually extends the flexible display 660 to the right so that an LTR screen can be read from the left to the right with respect to a left side 1805 while the LTR screen is displayed in the display area 1810 of the flexible display 660 as shown in FIG. 18A, the electronic device 601 may extend the flexible display 660 to the right to be read from left to right based on the left side 1805. On the other hand, when the user manually extends the flexible display 660 while the RTL screen is displayed on the display area 1820 of the flexible display 660 as shown in FIG. 18B, the electronic device 601 may extend the flexible display 660 to the left to be read from right to left with respect to a right 1825. As described above, by extending the flexible display 660 according to the content attribute, for example, the content direction, it is possible to provide an extended screen suitable for the direction of the language used by the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing;
a flexible display including a display area extendable in one or more directions with respect to the housing by moving a portion of the flexible display through the housing to be visually exposed;
memory storing one or more computer programs; and
one or more processors communicatively coupled to the flexible display and the memory,
wherein the one or more computer programs include computer-executable instructions that, when executed by the one or more processors individually or collectively, cause the electronic device to:
display first content on a first area of the flexible display,
detect an event for displaying second content related to the first content,
identify an attribute of the second content based on the detecting of the event,
identify a direction in which the flexible display is to be extended based on the attribute of the second content, and
display at least a portion of the second content in a second area of the flexible display extended in the identified direction, and
wherein, to identify the direction in which the flexible display is to be extended, the one or more computer programs further include computer-executable instructions that, when executed by the one or more processors individually or collectively, cause the electronic device to:
identify a position of a predetermined area where the second content is to be displayed on the first area with respect to a reference axis of the first area, and
identify the direction in which the flexible display is to be extended based on the position of the predetermined area with respect to the reference axis of the first area.

2. The electronic device of claim 1, wherein the one or more computer programs further include computer-executable instructions that, when executed by the one or more processors individually or collectively, cause the electronic device to:
identify one area of divided areas in the first area based on the predetermined area where the second content is to be displayed, and
identify the direction in which the flexible display is to be extended to correspond to the identified one area.

3. The electronic device of claim 1, wherein the at one or more computer programs further include computer-executable instructions that, when executed by the one or more processors individually or collectively, cause the electronic device to:
identify one area of divided areas in the first area based on a position of an object related to the displaying the second content displayed on the first area and the predetermined area where the second content is to be displayed.

4. The electronic device of claim 1, further comprising:
a sensor configured to sense an arrangement direction of the electronic device,
wherein the one or more computer programs further include computer-executable instructions that, when executed by the one or more processors individually or collectively, cause the electronic device to;
identify the arrangement direction of the electronic device using the sensor.

5. The electronic device of claim 4, wherein the one or more computer programs further include computer-executable instructions that, when executed by the one or more processors individually or collectively, cause the electronic device to:
display at least a portion of the second content in the second area of the flexible display extended in the identified direction of a first direction or a second direction of the electronic device when the arrangement direction of the electronic device is a landscape orientation, and
display at least a portion of the second content in the second area of the flexible display extended in the identified direction of a third direction or a fourth direction of the electronic device when the arrangement direction of the electronic device is a portrait orientation.

6. The electronic device of claim 1, wherein the one or more computer programs further include computer-executable instructions that, when executed by the one or more processors individually or collectively, cause the electronic device to;
detect an event for displaying the second content based on at least one of an input to an object related to displaying the second content displayed on the first area, a scroll input on the first area, or a predetermined input.

7. The electronic device of claim 1, wherein the one or more computer programs further include computer-executable instructions that, when executed by the one or more processors individually or collectively, cause the electronic device to:
- store, in the memory, a user configuration related to whether the second content is displayed in the second area of the flexible display,
- identify the direction in which the flexible display is to be extended when displaying the second content is configured to be activated in the second area based on the user configuration, and
- overlap and display at least a portion of the second content on the first area when the displaying of the second content is configured to be deactivated in the second area based on the user configuration.

8. The electronic device of claim 1, wherein the one or more computer programs further include computer-executable instructions that, when executed by the one or more processors individually or collectively, cause the electronic device to:
- display at least a portion of the second content in the second area of the flexible display extended in the identified direction together with the first content displayed on the first area.

9. A method performed by an electronic device, the method comprising:
- displaying, by the electronic device, first content on a first area of a flexible display of the electronic device, the flexible display including a display area, extendable in one or more directions with respect to a housing of the electronic device by moving a portion of the flexible display through the housing to be visually exposed;
- detecting, by the electronic device, an event for displaying second content related to the first content;
- based on the event being detected, identifying, by the electronic device, an attribute of the second content based on the detecting of the event;
- identifying, by the electronic device, a direction in which the flexible display is to be extended, based on the attribute of the second content; and
- displaying, by the electronic device, at least a portion of the second content in a second area of the flexible display extended in the identified direction,
- wherein the identifying of the direction in which the flexible display is to be extended comprises:
  - identifying, by the electronic device, a position of a predetermined area where the second content is to be displayed on the first area with respect to a reference axis of the first area, and
  - identifying, by the electronic device, the direction in which the flexible display is to be extended based on the position of the predetermined area with respect to the reference axis of the first area.

10. The method of claim 9, wherein the identifying of the direction in which the flexible display is to be extended further comprises:
- identifying, by the electronic device, one area of divided areas in the first area based on the predetermined area where the second content is to be displayed; and
- identifying, by the electronic device, the direction in which the flexible display is to be extended to correspond to the identified one area.

11. The method of claim 10, wherein the identifying of the one area of divided areas in the first area comprises:
- identifying, by the electronic device, the one area of divided areas in the first area based on a position of an object related to displaying the second content displayed on the first area and the predetermined area where the second content is to be displayed; and
- identifying, by the electronic device, the direction in which the flexible display is to be extended to correspond to the identified one area.

12. The method of claim 9, further comprising:
- sensing, by the electronic device using a sensor, an arrangement direction of the electronic device;
- displaying, by the electronic device, at least a portion of the second content in the second area of the flexible display extended in the identified direction of a first direction or a second direction of the electronic device based on the arrangement direction of the electronic device being a landscape orientation; and
- displaying, by the electronic device, at least a portion of the second content in the second area of the flexible display extended in the identified direction of a third direction or a fourth direction of the electronic device based on the arrangement direction of the electronic device being a portrait orientation.

13. The method of claim 9, further comprising:
- storing, by the electronic device, a user configuration related to whether to display the second content in the second area of the flexible display,
- wherein the identifying of the direction in which the flexible display is to be extended further comprises:
  - identifying, by the electronic device, the direction in which the flexible display is to be extended in response to the second content being configured to be activated in the second area of the flexible display based on the user configuration.

14. The method of claim 9, further comprising:
- displaying, by the electronic device, a frame of a first size including the second content on the first area in response to detecting the event for displaying second content; and
- displaying, by the electronic device, a frame of a second size including the second content on the second area in response to detecting that the display is fully extended in the identified direction.

15. The method of claim 14, wherein the second size is a size of the second area.

16. The method of claim 14,
- wherein the first size is less than the second size, and
- wherein the second area is smaller than the first area.

17. The electronic device of claim 1,
- wherein the attribute of the second content includes a content direction of the second content in which language is written and read, and
- wherein the direction in which the flexible display is to be extended is identified based on the content direction of the second content.

* * * * *